(12) United States Patent
Tanaka

(10) Patent No.: US 10,741,205 B2
(45) Date of Patent: Aug. 11, 2020

(54) BRAKE DEVICE

(71) Applicant: NEC Platforms, Ltd., Kawasaki-shi, Kanagawa (JP)

(72) Inventor: Atsushi Tanaka, Kawasaki (JP)

(73) Assignee: NEC PLATFORM, LTD., Kanagawa (JP)

( * ) Notice: Subject to any disclaimer, the term of this patent is extended or adjusted under 35 U.S.C. 154(b) by 0 days.

(21) Appl. No.: 16/461,460

(22) PCT Filed: Nov. 20, 2017

(86) PCT No.: PCT/JP2017/041593
§ 371 (c)(1),
(2) Date: May 16, 2019

(87) PCT Pub. No.: WO2018/101096
PCT Pub. Date: Jun. 7, 2018

(65) Prior Publication Data
US 2019/0348073 A1    Nov. 14, 2019

(30) Foreign Application Priority Data

Nov. 29, 2016  (JP) .................................. 2016-230760

(51) Int. Cl.
*G11B 5/56*    (2006.01)
*G11B 5/584*   (2006.01)

(52) U.S. Cl.
CPC .............. *G11B 5/56* (2013.01); *G11B 5/584* (2013.01)

(58) Field of Classification Search
CPC .................................. G11B 5/56; G11B 5/584
(Continued)

(56) References Cited

U.S. PATENT DOCUMENTS 4,725,907 A * 2/1988 Jue ..................... G11B 21/22
                                                  360/256.3
5,943,186 A * 8/1999 Muse ................ G11B 17/043
                                                  360/99.06
(Continued)

FOREIGN PATENT DOCUMENTS

JP    62-154318 A    7/1987
JP    3-228214 A    10/1991
(Continued)

OTHER PUBLICATIONS

International Search Report in International Application No. PCT/JP2017/041593, dated Feb. 13, 2018.
(Continued)

*Primary Examiner* — Allen T Cao

(57) ABSTRACT

The present invention addresses the problem of providing an output device, which can reduce the impact on an object to which power is supplied even when an output unit continuously fails to supply a voltage. To solve the problem a brake mechanism includes a contact member and a variable unit. The contact member may be brought into contact with a read head that reads information recorded as an information stream stored in a medium that moves relative to the read head. The variable unit changes a contact state between the contact member and the read head when the information representing the displacement between the position on the medium read by the read head and the position in the recorded information stream exceeds a prescribed range.

20 Claims, 25 Drawing Sheets

(58) Field of Classification Search
USPC .......................................................... 360/291
See application file for complete search history.

(56) References Cited

U.S. PATENT DOCUMENTS

| | | | | |
|---|---|---|---|---|
| 6,043,954 | A * | 3/2000 | Muse ........................ | G11B 5/54 360/99.06 |
| 6,115,214 | A * | 9/2000 | Allsup .................... | G11B 21/22 360/128 |
| 6,157,514 | A * | 12/2000 | Larsen ................. | G11B 17/043 360/99.06 |
| 6,204,982 | B1 * | 3/2001 | Larsen ................. | G11B 17/043 360/60 |
| 6,243,237 | B1 * | 6/2001 | Shimizu ............... | G11B 21/025 360/246.8 |
| 7,265,929 | B2 * | 9/2007 | Umeda .................... | G11B 5/54 360/75 |
| 2002/0141100 | A1 * | 10/2002 | Garrigues .......... | G11B 5/59627 360/75 |
| 2002/0186501 | A1 * | 12/2002 | Mayne ................. | G11B 17/043 360/99.06 |

FOREIGN PATENT DOCUMENTS

| | | |
|---|---|---|
| JP | 5-46960 A | 2/1993 |
| JP | 5-61811 U | 8/1993 |
| JP | 6-180831 A | 6/1994 |
| JP | 9-251625 A | 9/1997 |
| JP | 2006-18953 A | 1/2006 |
| JP | 2006-147034 A | 6/2006 |
| JP | 2011-40163 A | 2/2011 |
| WO | 2004/032320 A1 | 4/2004 |
| WO | 2007/085529 A1 | 8/2007 |

OTHER PUBLICATIONS

Written Opinion in International Application No. PCT/JP2017/041593, dated Feb. 13, 2018.
Communication dated Feb. 6, 2018, from the Japanese Patent Office in counterpart Application No. 2016-230760.
"What is a Solenoid", Shindengen Mechatronics Co., Ltd., retrieved on Oct. 28, 2016, https://www.shindengen.co.jp/smt/product/solenoid/index.html, 1 page.

* cited by examiner

CONTROL BOARD 102

BRAKE DEVICE

This application is a National Stage Entry of PCT/JP2017/041593 filed on Nov. 20, 2017, which claims priority from Japanese Patent Application 2016-230760 filed on Nov. 29, 2016, the contents of all of which are incorporated herein by reference, in their entirety.

TECHNICAL FIELD

The present invention relates to a brake device for reducing abnormality of a movement.

BACKGROUND ART

Some of hard disk drive devices and recording devices using a flash memory of a semiconductor are being replaced with a magnetic tape device. The reason is that attention is paid to an advantage that a capacity is large and a cost is reduced (see NPL 1).

In order to increase a recording capacity in a magnetic tape device, it is effective to increase a track density (see PTL 1). In order to increase a track density, it is effective to narrow a recording width (see PTL 1).

Note that, in relation to the present invention, PTL 2 discloses a position error signal. Further, in relation to the present invention, NPL 2 discloses a solenoid.

Further, PTL 3 discloses a magnetic head suspension device including a base to which a magnetic head is attached, a frame for fixing a position of the head, and a biasing means for biasing the base toward the frame.

Further, PTL 4 discloses a micro resonance device for changing a resonance frequency of a micro resonator by causing a micro movable unit drive mechanism to mechanically operate two micro movable units on the micro resonator.

CITATION LIST

Patent Literature

[PTL 1] Japanese Unexamined Patent Application Publication No. 2006-147034
[PTL 2] International Publication No. WO 2007/085529
[PTL 3] Japanese Unexamined Patent Application Publication No. 3-228214
[PTL 4] International Publication No. WO 2004/032320

Non Patent Literature

[NPL 1] IT Media News, "Expanding Demand for Magnetic Tape", [retrieved on Oct. 31, 2016], the Internet (http://www.itmedia.co.jp/news/articles/1605/09/news057.html)
[NPL 2] "What is a Solenoid?", SHINDENGEN MECHATRONICS Co., Ltd., the Internet, [retrieved on Oct. 28, 2016], the Internet (https://www.shindengen.co.jp/smt/product/solenoid/index.html)

SUMMARY OF INVENTION

Technical Problem

However, when a recording bit width for recording on a magnetic tape is narrowed in order to increase a track density, an allowance of a displacement from a recording bit stream of a reading position by a magnetic head is decreased. The reason is that a probability that, when a reading position by a magnetic head is displaced from a recording bit stream by a certain amount, a recording bit does not exist in the reading position is increased when a recording bit width is narrow.

An object of the present invention is to provide a brake mechanism and the like capable of reducing a displacement of a reading position by a head from a recorded information stream in a recording medium.

Solution to Problem

A brake mechanism of the present invention includes a contact member and a modification means. The contact member can be brought into contact with a head unit for reading recorded information of a recorded information stream recorded on a medium that moves relatively. The modification means modifies a contact state of the contact member with the head unit when information representing a displacement between a position read by the head unit in the medium and a position of the recorded information stream exceeds a predetermined range.

Advantageous Effects of Invention

The brake mechanism and the like of the present invention can reduce a displacement of a reading position by a head from a recorded information stream in a recording medium.

BRIEF DESCRIPTION OF DRAWINGS

FIG. 8 is an image diagram illustrating a state where a member 126b is brought into contact with a side portion of a member 116a.

FIG. 9 is an image diagram illustrating a state where a member 126c is brought into contact with a side portion of the member 116a.

FIG. 10 is an image diagram illustrating a state where a member 126d is brought into contact with a side portion of the member 116a.

FIG. 11 is an image diagram illustrating a state where a member 126e is brought into contact with a side portion of the member 116a.

EXAMPLE EMBODIMENT

A Configuration and an Operation

Figure 1:
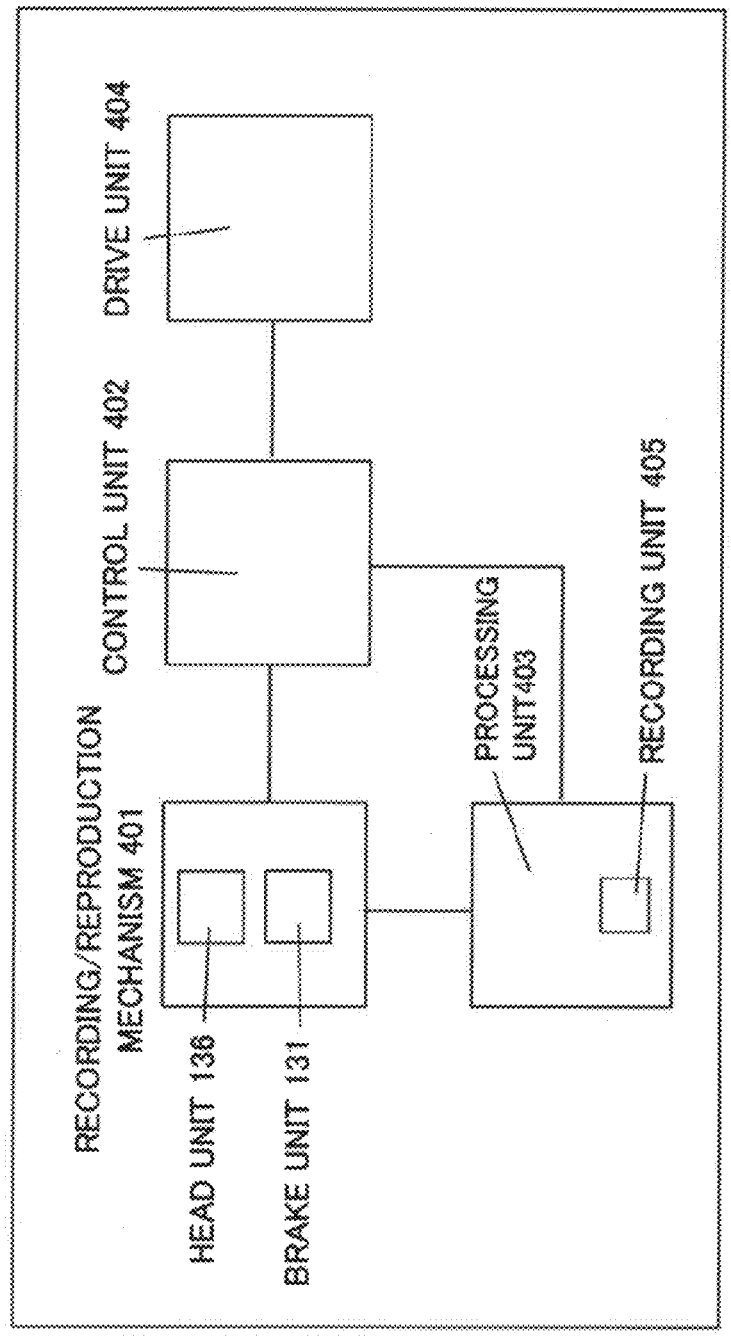
FIG. 1 is a block diagram illustrating a configuration example of a recording/reproduction device applicable with a brake device of the present example embodiment.

FIG. 1 is a block diagram illustrating a configuration of a recording/reproduction device 411 that is an example of a recording/reproduction device applicable with a brake device of the present example embodiment.

The recording/reproduction device 411 includes a recording/reproduction mechanism 401, a control unit 402, a processing unit 403, and a drive unit 404.

The recording/reproduction mechanism 401 includes a head unit 136 and a brake unit 131.

The control unit 402 controls an order of an operation executed by each of the recording/reproduction mechanism 401, the processing unit 403, and the drive unit 404.

The head unit 136 in the recording/reproduction mechanism 401 records information transmitted by the processing unit 403 on a recording medium that is not illustrated. The head unit 136 further reproduces the information recorded on the recording medium and transmits the reproduced information (reproduction information) to the processing unit 403.

The brake unit 131 in the recording/reproduction mechanism 401 modifies a contact state with the head unit 136 by using instruction information from the processing unit 403.

The processing unit 403 derives position error information from the reproduction information transmitted from the head unit 136. The position error information is information representing a degree in which a position in the medium read by a recording/reproduction unit, to be described later with reference to FIG. 2, of the head unit 136, is displaced from a position where an information stream in the recording medium is supposed to be recorded. The position error information (position error signal) is described in, for example, PTL 2, and therefore detailed description is omitted herein.

The processing unit 403 transmits the instruction information described above to the brake unit 131 when position error information falls outside a predetermined range.

The drive unit 404 drives the recording medium in such a way that the head unit 136 can execute recording/reproduction of the recording medium.

Note that the recording/reproduction device 411 includes a power supply, not illustrated, that supplies power to each component included in the recording/reproduction device 411.

Figure 2:
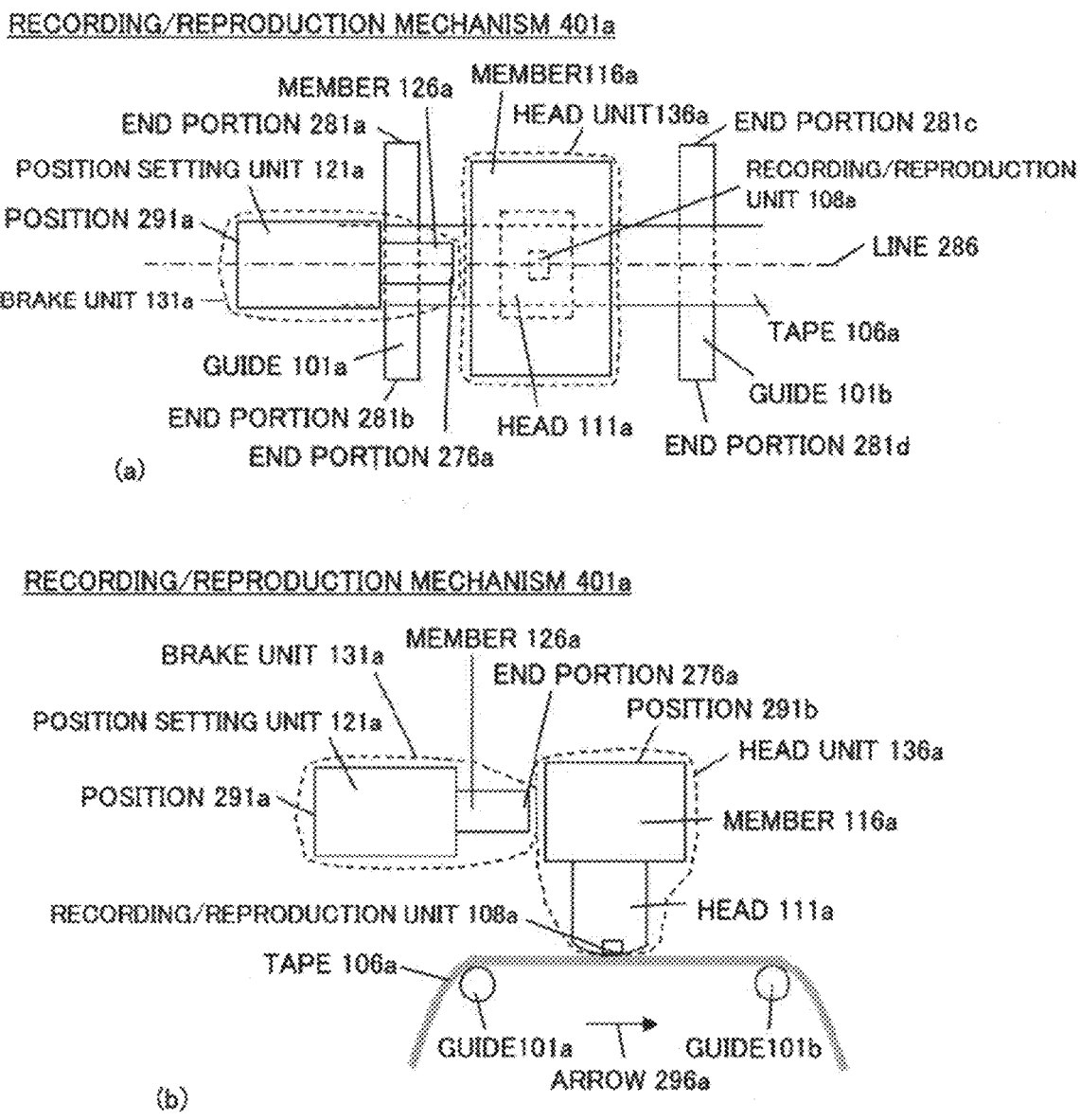
FIG. 2 is a conceptual diagram illustrating a configuration example of a recording/reproduction mechanism.

FIG. 2 is a conceptual diagram illustrating a configuration of a recording/reproduction mechanism 401a that is an example of the recording/reproduction mechanism 401 illustrated in FIG. 1.

FIG. 2(a) is a top view of the recording/reproduction mechanism 401a. FIG. 2(b) is a cross-sectional view, assuming that the recording/reproduction mechanism 401a is cut along a line 286 illustrated in FIG. 2(a). The recording/reproduction mechanism 401a is a part of a vicinity of a magnetic head in a recording/reproduction device that records information on a magnetic tape by using the magnetic head and reproduces the information recorded on the magnetic tape. FIGS. 2(a) and (b) illustrate a tape 106a together that is an example of the magnetic tape.

Note that it is assumed that a top/a bottom and a left/a right in description of the present example embodiment represent a top/a bottom and a left/a right in a drawing to be an object.

The recording/reproduction mechanism 401a includes a brake unit 131a, a head unit 136a, and guides 101a and 101b. A position 291a of the brake unit 131a, a position 291b of the head unit 136a, end portions 281a and 281b, illustrated in FIG. 2(a), of the guide 101a, and end portions 281c and 281d of the guide 101b are mutually fixed by a common member that is not illustrated. The brake unit 131a and the head unit 136a are an example of the brake unit 131 and the head unit 136 illustrated in FIG. 1.

The tape 106a is driven by the drive unit 404 illustrated in FIG. 1 and moves in a direction of an arrow 296a on the guides 101a and 101b in a way of viewing illustrated in FIG. 2(b).

The head unit 136a includes a member 116a and a head 111a. The head 111a includes a recording/reproduction unit 108a.

The head 111a is an integral and inseparable member including the recording/reproduction unit 108a. Herein, being integral and inseparable indicates that it is difficult to disassemble by using a usual method and it is extremely difficult to combine, when being disassembled, disassembled things to an original state.

The head unit 136a is a portion that exhibits an appearance of a single component, can be attached to another member and be detached from another member, and can be disassembled to some parts and be combined again from disassembled parts.

The recording/reproduction unit 108a converts (reproduces), to an electric signal, magnetic information recorded on the tape 106a when the tape 106a moves in a direction of the arrow 296a. The electric signal is transmitted to the processing unit 403 in the recording/reproduction device 411 illustrated in FIG. 1. Further, the recording/reproduction unit 108a records magnetic information on the tape 106a by using a signal transmitted from the processing unit 403.

The brake unit 131a includes a position setting unit 121a and a member 126a.

When receiving the brake instruction information described above from the processing unit 403 illustrated in FIG. 1, the position setting unit 121a executes the following operation.

The position setting unit 121a moves the member 126a in a direction of the arrow 296a when the end portion 276a of the member 126a is in non-contact with the member 116a of the head unit 136a. Thereby, the end portion 276a of the member 126a is brought into contact with the member 116a of the head unit 136a.

On the other hand, the position setting unit 121a moves the member 126a to an inverse direction of the arrow 296a when the end portion 276a of the member 126a is in contact with the member 116a of the head unit 136a. Thereby, the end portion 276a of the member 126a becomes in non-contact with the member 116a of the head unit 136a.

The brake unit 131a executes, through the above-described operation, the braking described above for reducing a motion of the head unit 136 that inhibits recording/reproduction of information on/from the tape 106a executed by the recording/reproduction unit 108a.

It is assumed that, for example, the motion is an abnormal vibration due to a predetermined resonance of the head unit 136. When the resonance is occurring while the member 126a is in non-contact with the member 116a, the member 126a is brought into contact with the member 116a and thereby, for example, a resonance frequency of the head unit 136a can be modified. Then, the abnormal vibration may be reduced by modifying the resonance frequency. On the other hand, when the resonance is occurring while the member 126a is in contact with the member 116a, the member 126a is brought into non-contact with the member 116a, and thereby a resonance frequency of the head unit 136a can be modified. Then, the abnormal vibration may be reduced by modifying the resonance frequency.

Alternatively, it is also assumable that the motion is a wobbling of the head unit 136a. In this case, the member 126a is brought into contact with the member 116a, and thereby the member 126a supports the member 116a and the wobbling may be reduced.

Further, the position setting unit 121a may switch, in a multi-stage manner, a strength for bringing the end portion 276a into contact with the member 116a of the head unit 136a. Even when it is difficult to reduce the motion when a strength of contact of the end portion 276a with the member 116a is weak, it is assumable that the motion is reduced with strong contact. Further, even when the motion occurs in both cases of strong contact and no contact, it is assumable that the motion is reduced with weak contact. The multi-stage switching can also adjust a contact state associated with the above-described cases.

The member 126a is preferably a deformable elastic material. The reason is that when the member 126a is a hard material, it is difficult to adjust a contact state between the member 126a and the head unit 136a. Further, when the member 126a is a hard material, breakage may occur in the brake unit 131a or the head unit 136a when the member 126a is strongly pressed against the head unit 136a. A detailed example of the member 126a is described later.

Any shape and size of the member 116a are applicable.

Figure 3:
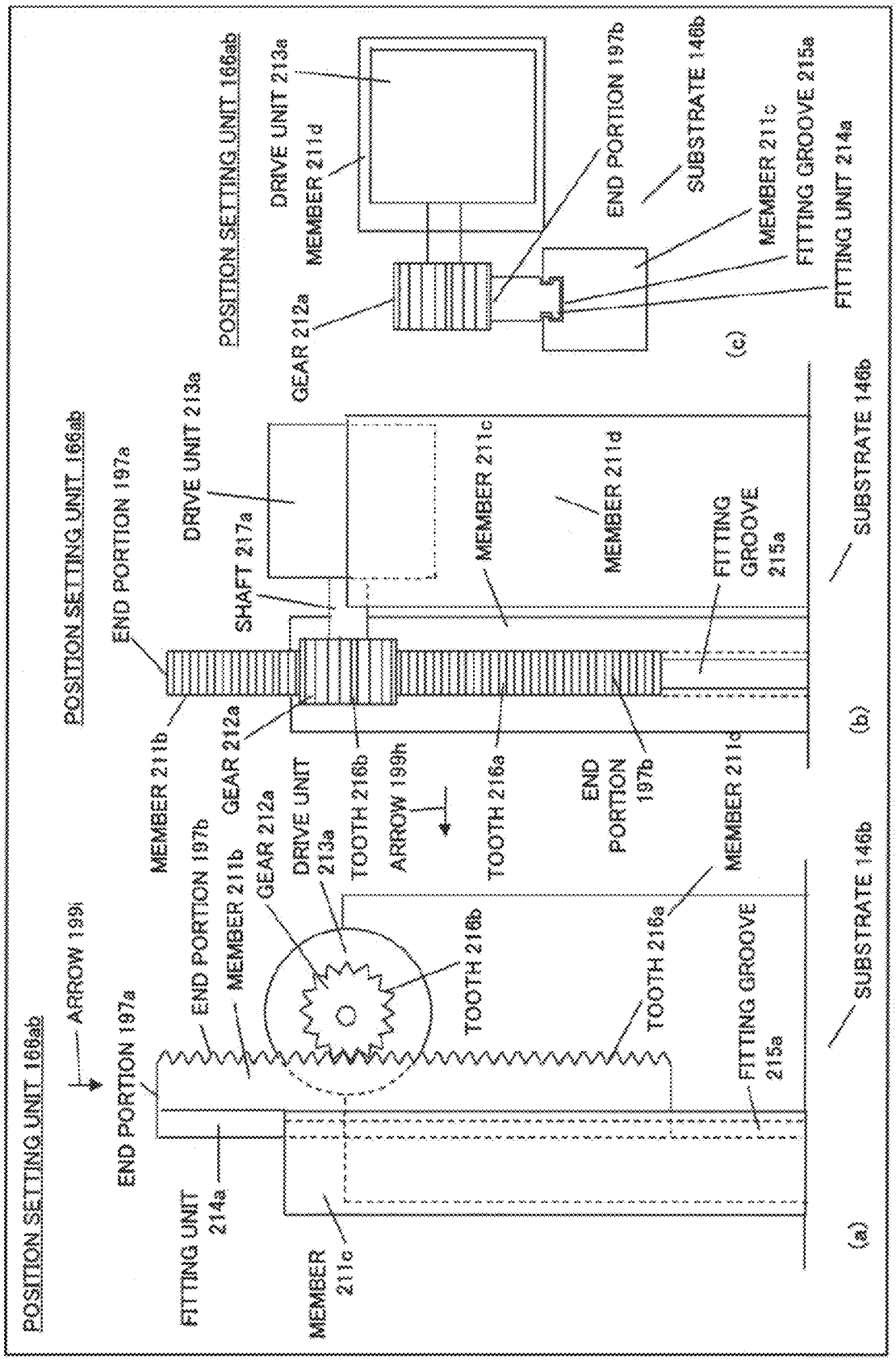
FIG. 3 is a conceptual diagram illustrating a first configuration example of a position setting unit.

FIG. 3 is a conceptual diagram illustrating a configuration of a position setting unit 166ab that is a first example of the position setting unit 121a illustrated in FIG. 2. FIG. 3(a) is a side view of the position setting unit 166ab. FIG. 3(b) is a diagram in which it is assumed that a direction of an arrow 199h illustrated in FIG. 3(a) of the position setting unit 166ab is viewed. Further, FIG. 3(c) is a diagram in which it is assumed that a direction of an arrow 199i illustrated in FIG. 3(a) of the position setting unit 166ab is viewed.

The position setting unit 166ab includes a gear 212a, a drive unit 213a, and members 211b to 211d.

The member 211c and the member 211d are fixed to a substrate 146b.

In the member 211c, a fitting groove 215a is formed. The fitting groove 215a is a groove for enabling the member 211b to move in a vertical direction in FIG. 3(a) and FIG. 3(b) while a fitting unit 214a of the member 211b to be described later is fitted.

The drive unit 213a is fixed to the member 211d.

The drive unit 213a can rotate a shaft 217a of the drive unit 213a in a forward direction and a backward direction. The gear 212a is fixed to the shaft 217a. The drive unit 213a can rotate the gear 212a by rotating the shaft 217a.

A tooth 216b of the gear 212a is engaged with a tooth 216a formed in an end portion 197b of the member 211b. The drive unit 213a can move the member 211b in upward and downward directions in FIG. 3(a) and FIG. 3(b) by rotating the gear 212a. A movement amount of the member 211b can be adjusted by a rotation amount acquired by rotating the shaft 217a by using the drive unit 213a.

In the configuration illustrated in FIG. 3, the member 126a illustrated in FIG. 2 is fixed to the member 211b, and thereby the position setting unit 166ab can move the member 126a in left and right directions in a way of viewing illustrated in FIG. 2(b). At that time, a position of the member 211b for fixing the member 126a is freely selected as long as the member 126a can move in left and right directions of FIG. 2. Note that the movement in left and right directions in a way of viewing illustrated in FIG. 2(b) herein is a movement in a direction having left and right direction components in a way of viewing illustrated in FIG. 2(b). The movement may be a movement in left and right directions along with a movement in upward and downward directions in a way of viewing illustrated in FIG. 2(a) or in upward and downward directions in a way of viewing illustrated in FIG. 2(b).

Figure 4:
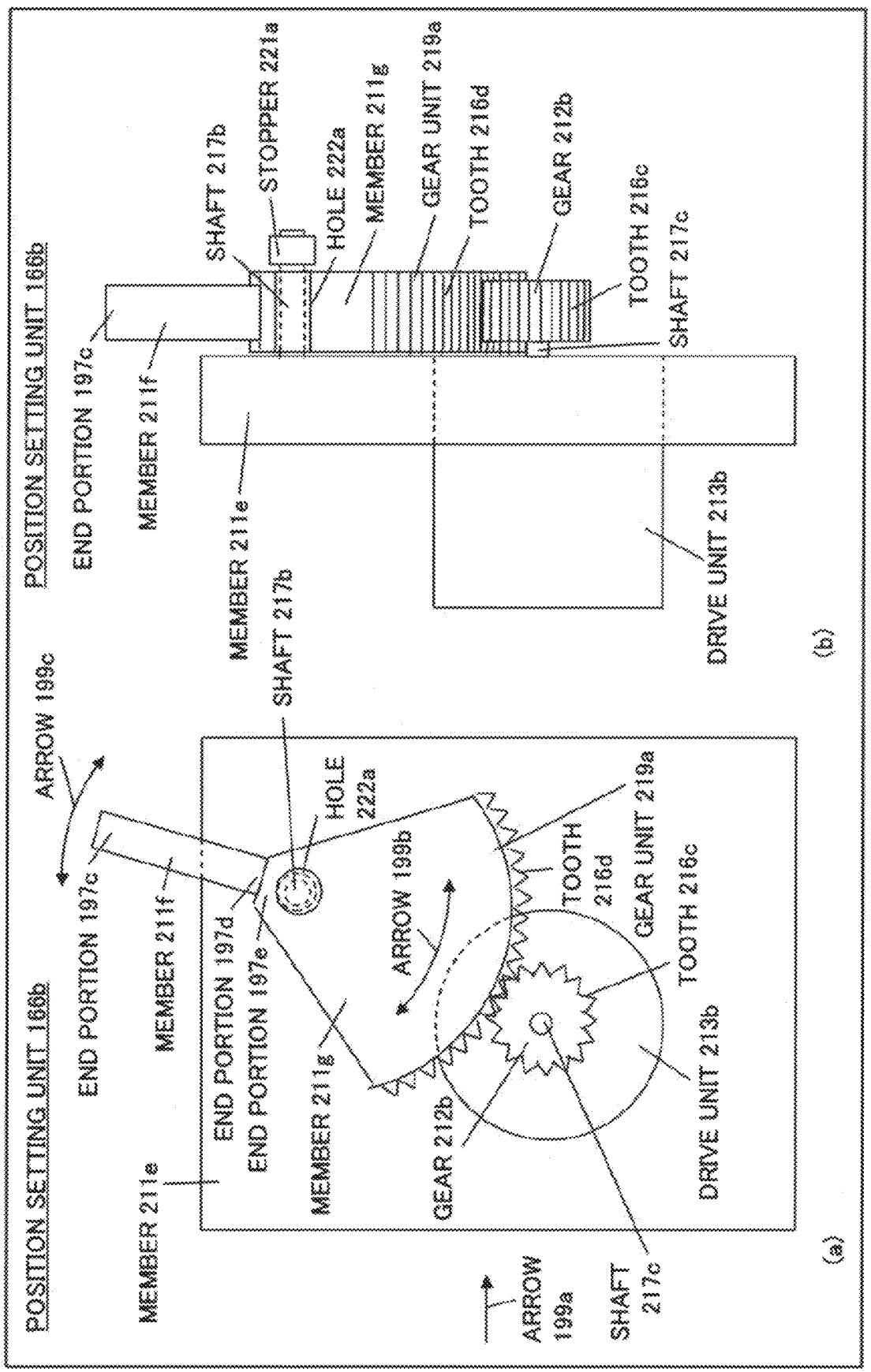
FIG. 4 is a conceptual diagram illustrating a second configuration example of a position setting unit.

FIG. 4 is a conceptual diagram illustrating a configuration of a position setting unit 166b that is a second example of the position setting unit 121a illustrated in FIG. 2. FIG. 4(a) is a side view of the position setting unit 166b. Further, FIG. 4(b) is a diagram in which it is assumed that a direction of an arrow 199a illustrated in FIG. 4(a) of the position setting unit 166b is viewed.

The position setting unit 166b includes members 211e, 211f, and 211g, a drive unit 213b, a gear 212b, and a shaft 217b.

In a gear unit 219a of the member 211g, a gear 216d is formed.

In the member 211g, a hole 222a having a diameter slightly larger than a diameter of a shaft 217b fixed to the member 211e is formed. The shaft 217b is inserted in the hole 222a. The member 211g can rotate in a direction of an arrow 199b around the shaft 217b. The member 211g is formed in a such a way as not to come off the shaft 217b by using a stopper 221a formed in the shaft 217b.

The drive unit 213b is fixed to the member 211e. The drive unit 213b can rotate the gear 212b by rotationally driving the shaft 217c. A tooth 216c of the gear 212b is engaged with a tooth 216d of the member 211g. Therefore, the drive unit 213b can rotate the member 211g in a direction of the arrow 199b by driving the gear 212b.

An end portion 197d of the member 211f is fixed to an end portion 197e of the member 211g. Therefore, the end portion 197c of the member 211f can rotate in a direction of an arrow 199c around the shaft 217b by driving the gear 212b by using the drive unit 213b.

Therefore, when the member 126a illustrated in FIG. 2 is fixed to the end portion 197c, the position setting unit 166b can move the member 126a in a direction of the arrow 199c.

Instead of the gear 212b, by using a tooth having a spiral shape as will be described later in the section of Specific Example, a structure in which the spiral shaped tooth is engaged with the tooth 216d may be used.

Further, instead of the structures illustrated in FIG. 3 and FIG. 4, a drive element referred to as a solenoid can be used. A solenoid is disclosed in, for example, NPL 2. However, when it is desired that position setting of the end portion 276a of the member 126a illustrated in FIG. 2 is executed at three stages or more, it is conceivable that the method illustrated in FIG. 2 and FIG. 3 or a method described in a specific example to be described later is preferable.

Figure 5:
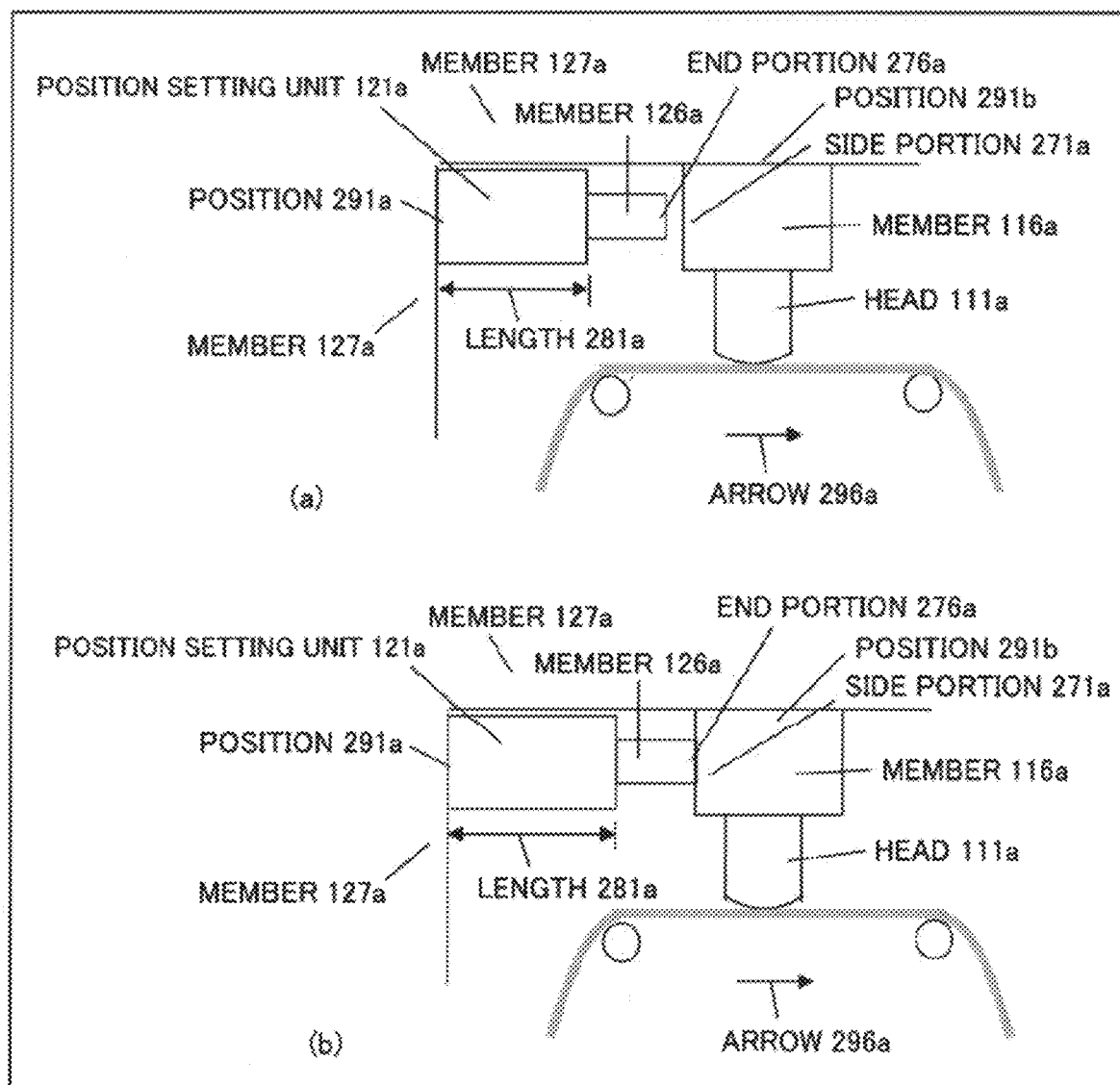
FIG. 5 is an image diagram illustrating an operation example of a position setting unit.

FIG. 5 is an image diagram illustrating an operation of the position setting unit 121a illustrated in FIG. 2. Both the position 291a of the position setting unit 121a and the position 291b of the member 116a are fixed to a member 127a.

FIG. 5(a) is a state where the end portion 276a of the member 126a is separated from a side portion 271a of the member 116a. When the brake instruction information described above arrives from this state, the position setting unit 121a increases a length 281a as illustrated in FIG. 5(b). Thereby, the member 126a moves to right, and the end portion 276a is brought into contact with the side portion 271a of the member 116a.

When the brake instruction information described above arrives from a state illustrated in FIG. 5(b), the position setting unit 121a decreases the length 281a as illustrated in FIG. 5(a). Thereby, the member 126a moves to left, and the end portion 276a is brought into non-contact with the side portion 271a of the member 116a.

As described above, the position setting unit 121a may switch a strength of contact of the end portion 276a of the member 126a with the side portion 271a of the member 116a at a plurality of stages.

Figure 6:
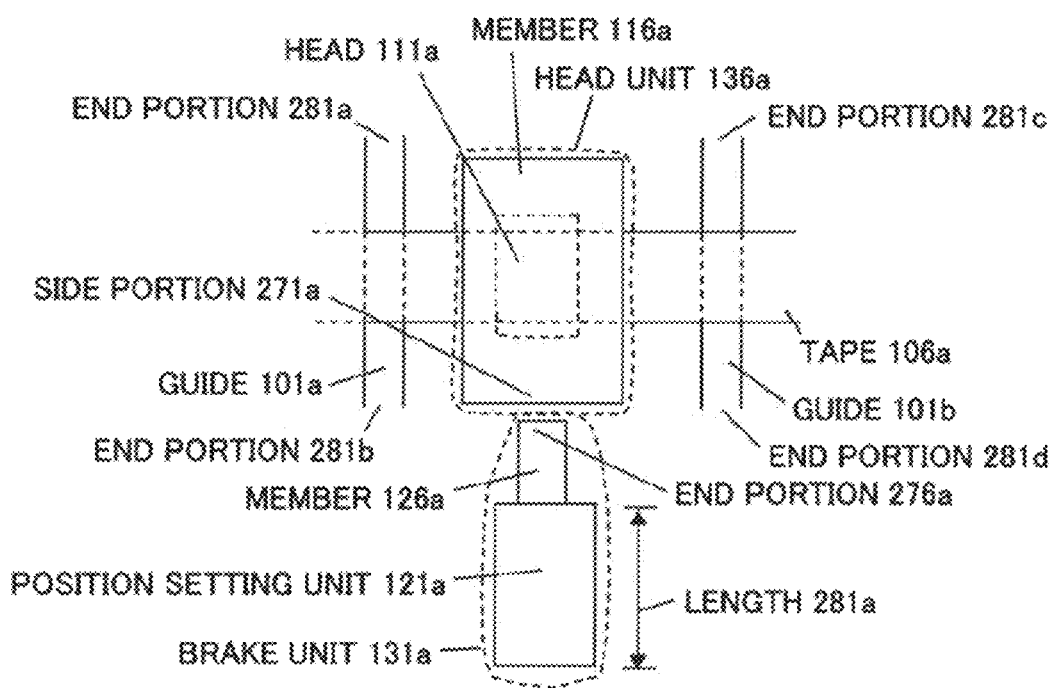
FIG. 6 is a diagram illustrating a disposition example of the position setting unit.

A position in the member 116a of the head unit 136a with which the position setting unit 121a brings the member 126a into contact can be appropriately selected, depending on a situation of a motion of the head unit 136 that inhibits recording/reproduction of magnetic information on/from the tape 106a. As in a top view illustrated in FIG. 6, for example, a configuration in which the position setting unit 121a can bring the end portion 276a of the member 126a into contact with the side portion 271a of a lower side of the member 116a is applicable.

Figure 7:
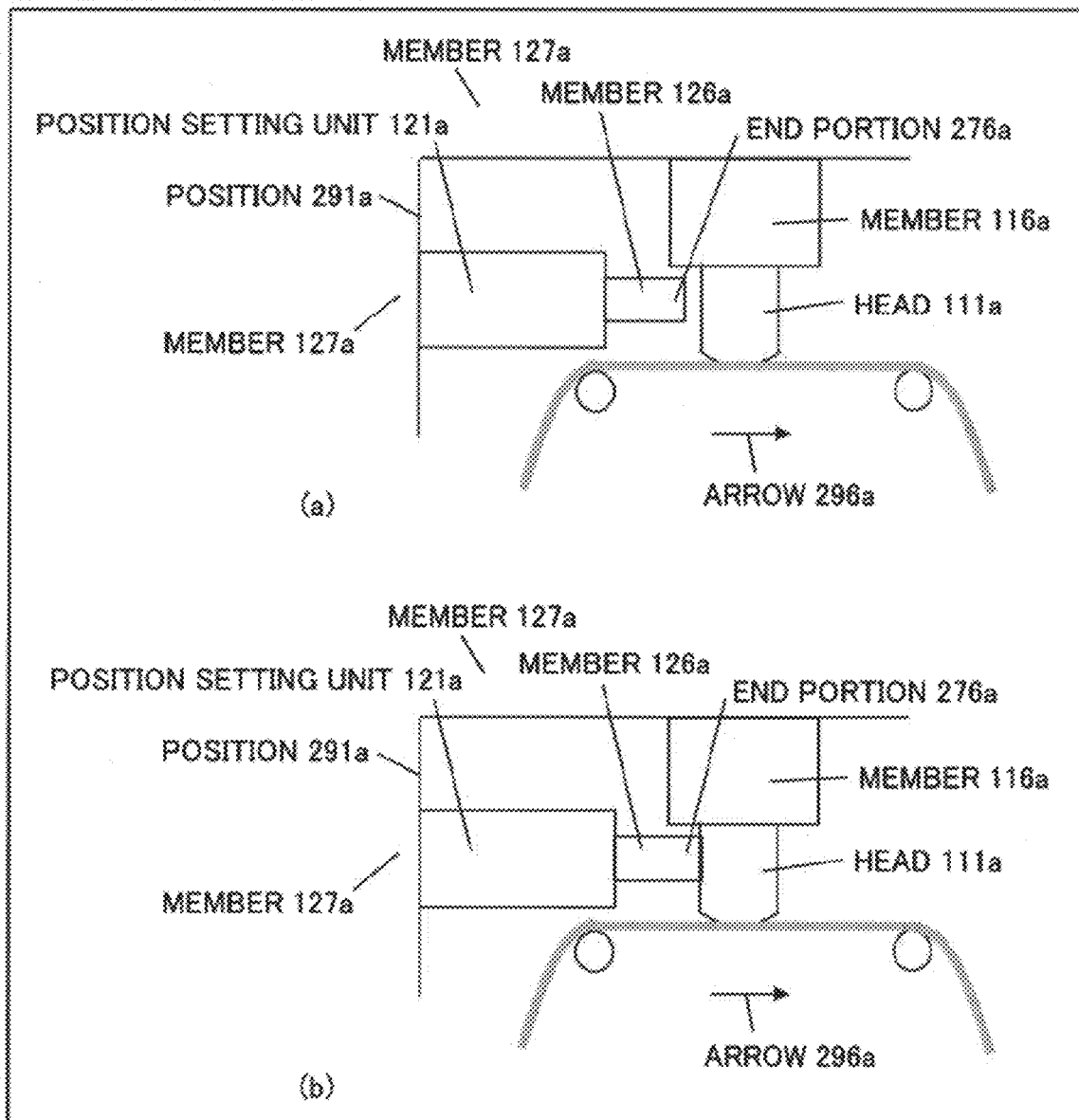
FIG. 7 is a diagram illustrating another disposition example of the position setting unit.

A location with which the position setting unit 121a brings the member 126a into contact may be the head 111a. As illustrated in FIG. 7, disposition of the position setting unit 121a may be set in such a way that the end portion 276a of the member 126a can be bought into contact with the head 111a.

Next, detailed examples of the member 126a illustrated in FIG. 2 are described.

Figure 8:
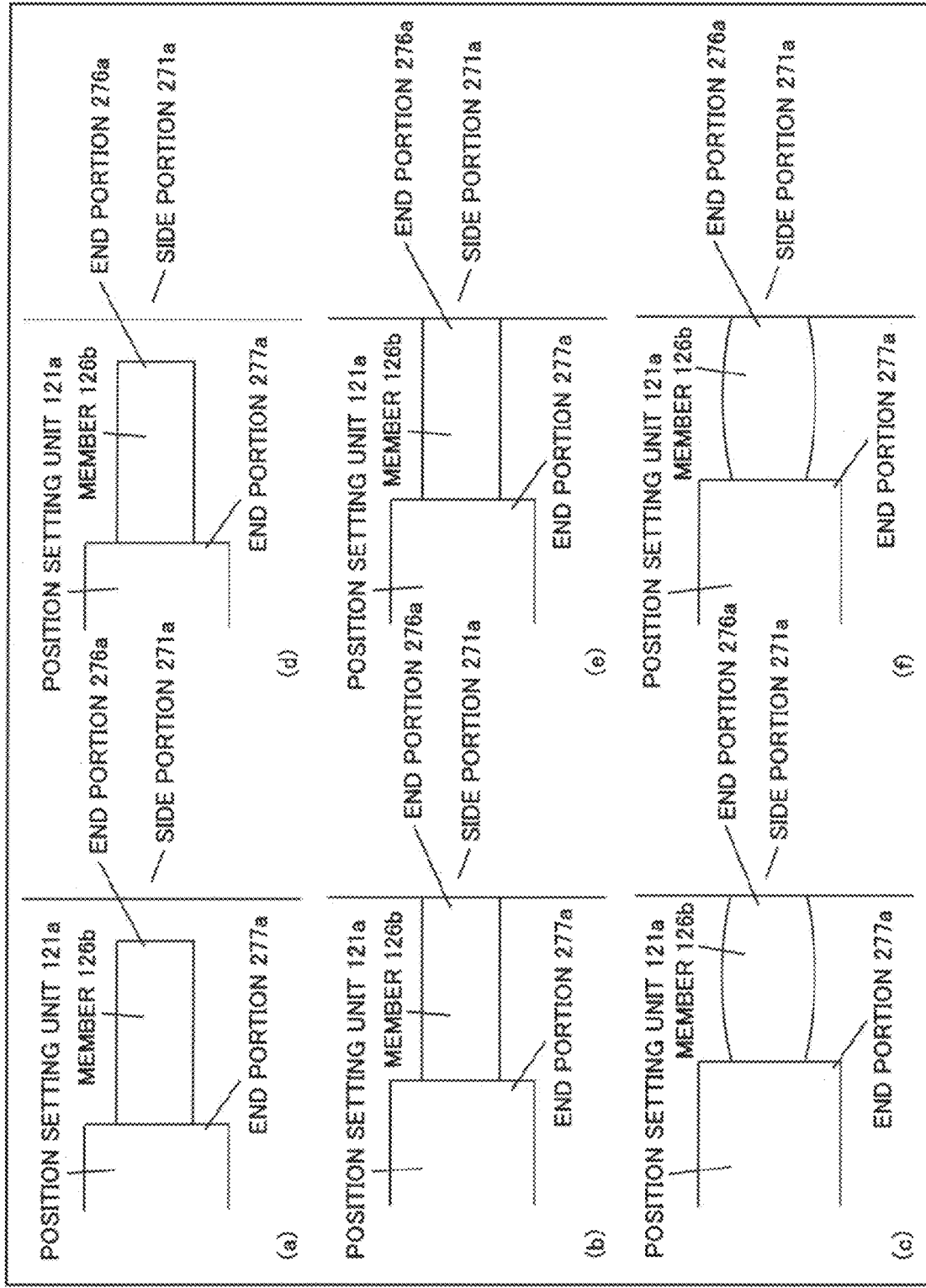

FIG. 8 is an image diagram illustrating a state where a member 126b that is a first example of the member 126a is brought into contact with the side portion 271a of the member 116a illustrated in FIG. 5. FIG. 8(a) to (c) are side views in which it is assumed that the same direction as the direction of a way of viewing illustrated in FIG. 5(a) is viewed. FIG. 8(d) to (f) are top views.

The member 126b is an elastic member such as rubber and the like.

The member 126b has a shape illustrated in FIGS. 8(a) and (d) before an end portion 276a is brought into contact with the side portion 271a.

As illustrated in FIGS. 8(b) and (e), the member 126b is not substantially deformed while the end portion 276a is slightly brought into contact with the side portion 271a.

As illustrated in FIGS. 8(c) and (f), the member 126b is deformed when the member 126b is moved to right by the position setting unit 121a and thereby the end portion 276a is strongly pressed against the side portion 271a.

Thereafter, when an end portion 277a of the position setting unit 121a moves to left, the member 126b returns to the shape illustrated in FIGS. 8(a) and (d).

With regard to a shape of the member 126b, in addition to the shape illustrated in FIG. 8, various shapes are assumable. Further, the member 126b does not always need to be constituted of a uniform material. The member 126b, for example, may include a hollow inside or may be cylindrical or sponge-like.

Figure 9:
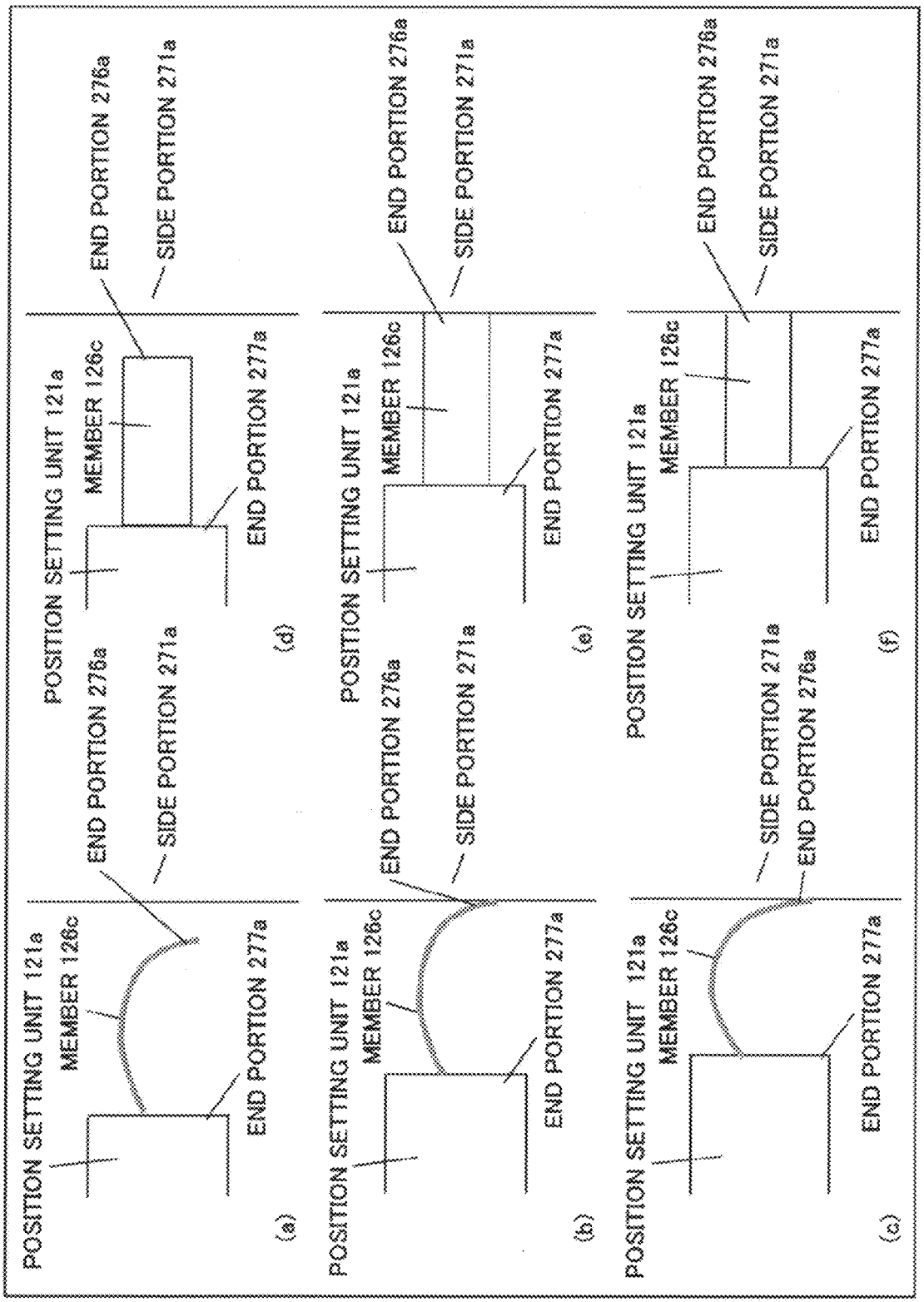

FIG. 9 is an image diagram illustrating a state where a member 126c that is a second example of the member 126a is brought into contact with the side portion 271a of the member 116a illustrated in FIG. 5. FIG. 9(a) to (c) are side views in which it is assumed that the same direction as the direction of a way of viewing illustrated in FIGS. 5(a) and (b) is viewed. FIG. 9(d) to (f) are top views.

The member 126c is a curved plate-spring-shaped member.

The member 126c has a shape illustrated in FIGS. 9(a) and (d) before the end portion 276a is brought into contact with the side portion 271a.

As illustrated in FIGS. 9(b) and (e), the member 126c is not substantially deformed while the end portion 276a is slightly brought into contact with the side portion 271a.

As illustrated in FIGS. 9(c) and (f), the member 126c is further curved when the member 126c is moved to right by the position setting unit 121a and thereby the end portion 276a is strongly pressed against the side portion 271a.

Thereafter, when the end portion 277a of the position setting unit 121a moves to left, the member 126c returns to the shape illustrated in FIGS. 9(a) and (d).

Figure 10:
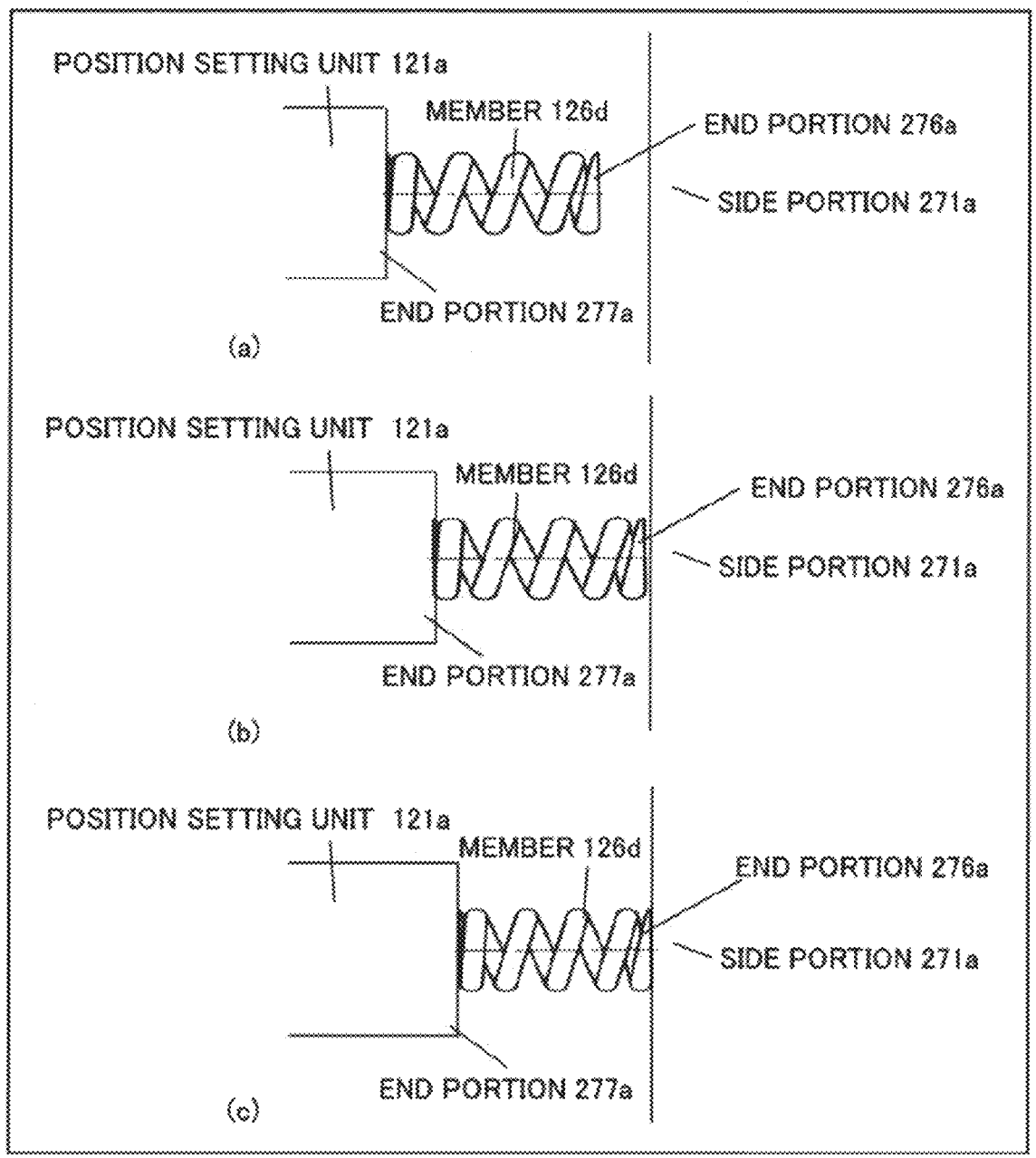

FIG. 10 is an image diagram illustrating a state where a member 126d that is a third example of the member 126a is brought into contact with the side portion 271a of the member 116a illustrated in FIG. 5. FIG. 10(a) to (c) are side views in which it is assumed that the same direction as the direction of a way of viewing illustrated in FIG. 5(a) and (b) is viewed. A top view is also similar to the shape illustrated in FIG. 10(a) to (c).

The member 126d is a spring.

The member 126d has a shape illustrated in FIG. 10(a) before the end portion 276a is brought into contact with the side portion 271a.

As illustrated in FIG. 10(b), the member 126d is not substantially deformed while the end portion 276a is slightly brought into contact with the side portion 271a.

As illustrated in FIG. 10(c), the member 126d is shrunk in left and right directions when the member 126d is moved to right by the position setting unit 121a and thereby the end portion 276a is strongly pressed against the side portion 271a.

Thereafter, when the end portion 277a of the position setting unit 121a moves to left, the member 126d returns to the shape illustrated in FIG. 10(a).

Figure 11:
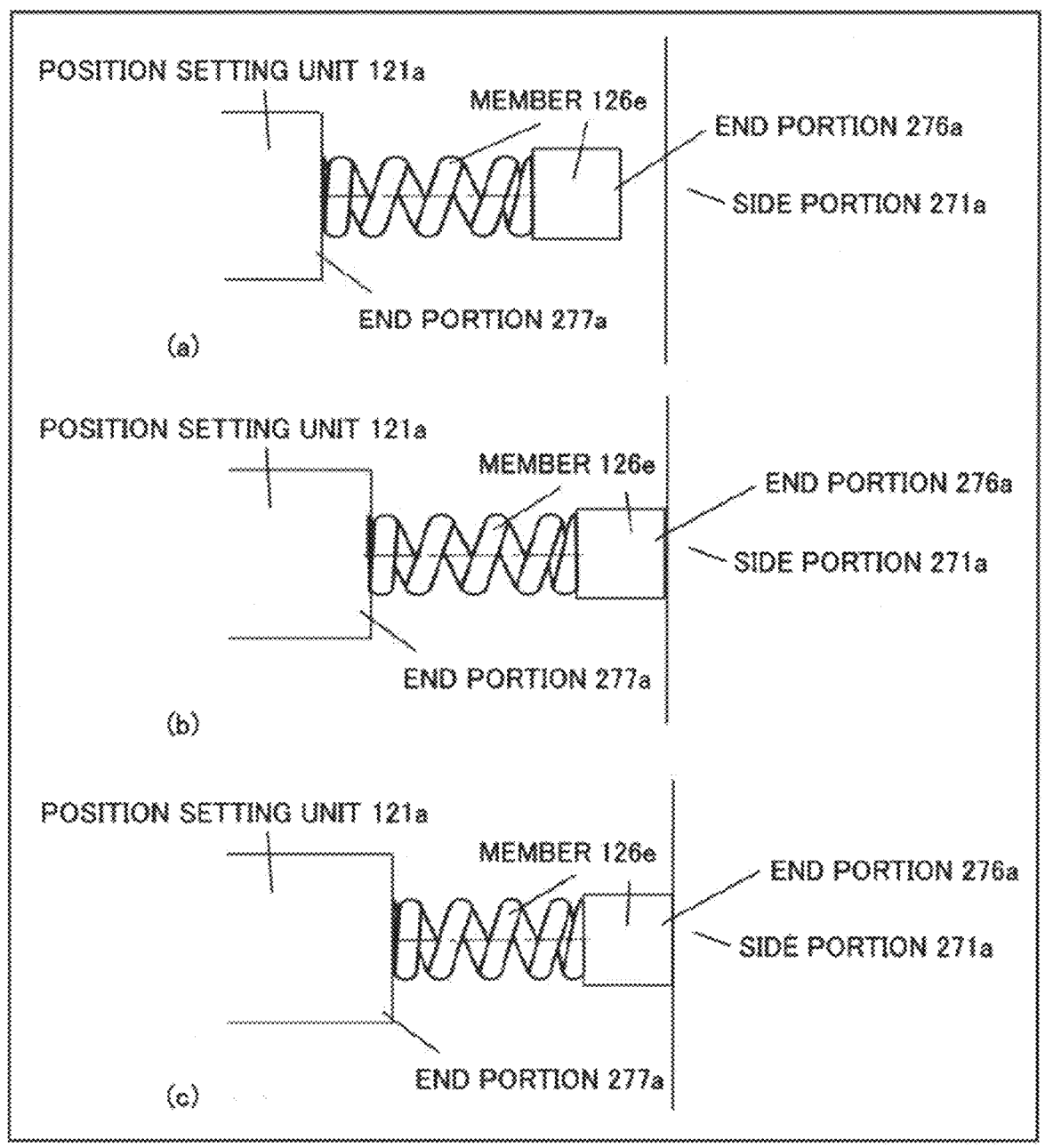

FIG. 11 is an image diagram illustrating a state where a member 126e that is a fourth example of the member 126a is brought into contact with the side portion 271a of the member 116a illustrated in FIG. 5. FIG. 11(a) to (c) are side views in which it is assumed that the same direction as the direction of a way of viewing illustrated in FIGS. 5(a) and (b) is viewed. A top view is also similar to the shape illustrated in FIG. 11(a) to (c).

The member 126e is a member in which a spring and another member are combined. The another member is, for example, an elastic member.

The member 126e has a shape illustrated in FIG. 11(a) before the end portion 276a is brought into contact with the side portion 271a.

As illustrated in FIG. 11(b), the member 126e is not substantially deformed while the end portion 276a is slightly brought into contact with the side portion 271a.

As illustrated in FIG. 11(c), mainly, a spring portion of the member 126e is shrunk in left and right directions when the member 126e is moved to right by the position setting unit 121a and the end portion 276a is strongly pressed against the side portion 271a.

Thereafter, when the end portion 277a of the position setting unit 121a moves to left, the member 126e returns to the shape illustrated in FIG. 11(a).

Processing Flow

Figure 12:
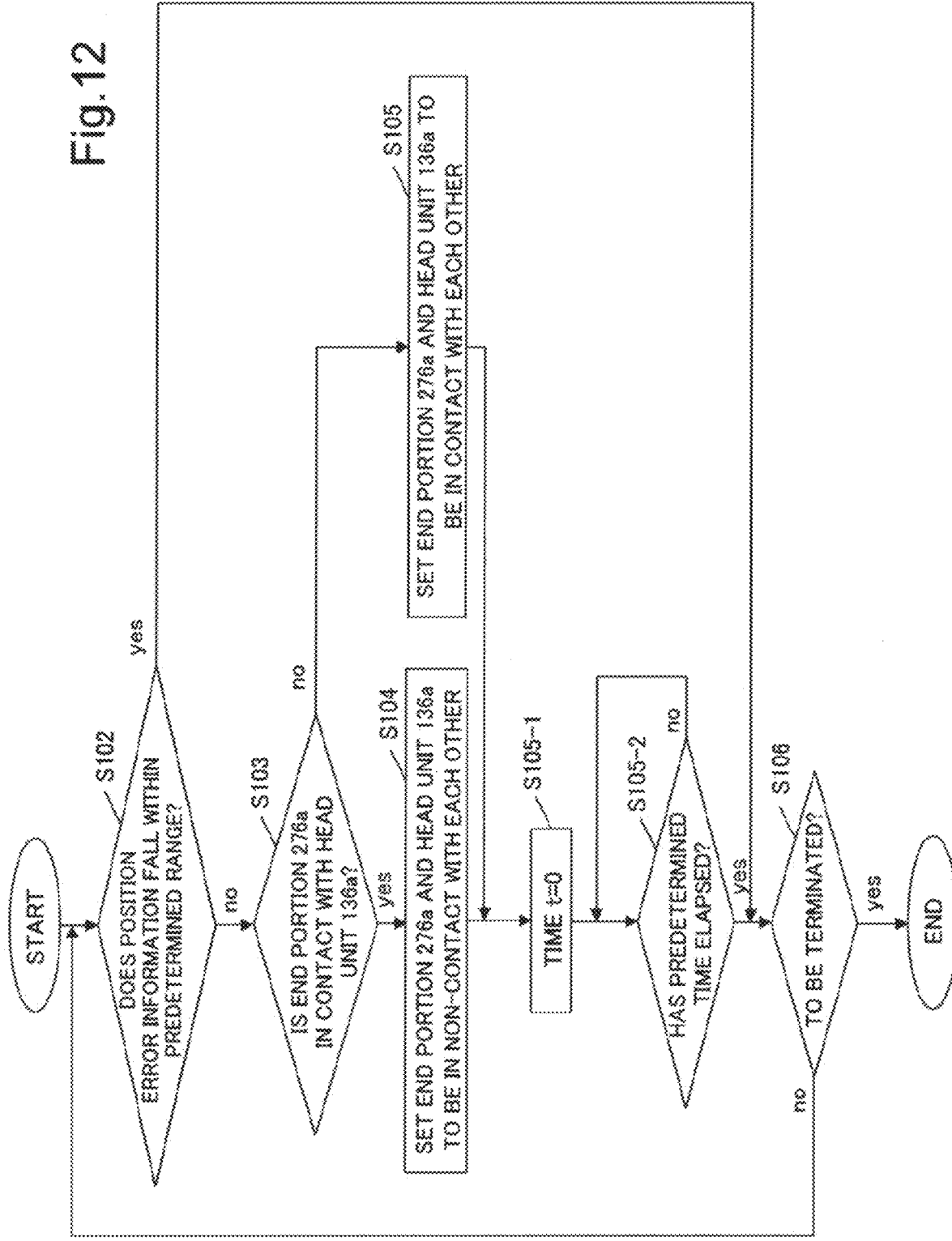
FIG. 12 is a conceptual diagram illustrating a processing flow example of control processing in a brake unit executed by a processing unit.

FIG. 12 is a conceptual diagram illustrating a processing flow example of control processing in the brake unit 131a, illustrated in FIG. 2, executed by the processing unit 403 illustrated in FIG. 1.

As an assumption of processing illustrated in FIG. 12, it is assumed that the processing unit 403 sequentially generates the error information described above from a reproduction signal acquired by reproducing, by the head unit 136a illustrated in FIG. 2, information recorded on the tape 106a and stores the generated error information on a recording unit 405 illustrated in FIG. 1.

First, the processing unit 403 starts processing illustrated in FIG. 12, for example, based on a reproduction start of information recorded on the tape 106a by the head unit 136a illustrated in FIG. 2.

The processing unit 403 reads, as processing of S102, the latest position error information from the recording unit 405 illustrated in FIG. 1 and determines whether the position error information falls outside a predetermined range. The predetermined range is a range of position error information previously determined for the processing of S102.

The processing unit 403 executes processing of S103 when a determination result based on the processing of S102 is no.

On the other hand, the processing unit 403 executes processing of S106 when a determination result based on the processing of S102 is yes.

When executing processing of S103, the processing unit 403 determines, as the processing, whether the end portion 276a of the member 126a is in contact with the member 116a of the head unit 136a. The processing unit 403 executes the determination by determining whether, for example, the position setting unit 121a of the brake unit 131a is set to bring the end portion 276a into contact with the member 116a.

When a determination result based on the processing of S103 is yes, the processing unit 403 sets, as processing of S104, the end portion 276a and the member 116a to be in non-contact with each other. The processing unit 403 executes the setting by setting the position setting unit 121a to bring the end portion 276a and the member 116a into non-contact with each other.

Then, the processing unit 403 executes processing of S105-1.

On the other hand, when a determination result based on the processing of S103 is no, the processing unit 403 sets, as processing of S105, the end portion 276a and the member 116a to be in contact with each other. The processing unit 403 executes the setting by setting the position setting unit 121a to bring the end portion 276a and the member 116a into contact with each other.

Then, the processing unit 403 executes processing of S105-1.

When executing processing of S105-1, the processing unit 403 sets, as the processing, a time t as 0 and starts measuring an elapsed time from the time t=0.

The processing unit 403 determines, as processing of S105-2, whether a predetermined time has elapsed from the time t=0 set based on the processing of S105-1. S105-2 is processing to be executed for an intent of waiting for actual contact or actual non-contact of the end portion 276a and the head unit 136a, in response to the processing of S104 or S105.

When a determination result based on the processing of S105-2 is yes, the processing unit 403 executes processing of S106.

On the other hand, when a determination result based on the processing of S105-2 is no, the processing unit 403 executes the processing of S105-2 again.

When executing processing of S106, the processing unit 403 determines, as the processing, whether to terminate the processing illustrated in FIG. 12. The processing unit 403 executes the determination, for example, by determining a presence or absence of input of termination information from an outside. The termination information is input to the processing unit 403, for example, on reproduction termination of information recorded on the tape 106a by the head unit 136a illustrated in FIG. 2. When a determination result based on the processing of S106 is yes, the processing unit 403 terminates the processing illustrated in FIG. 12.

On the other hand, when a determination result based on the processing of S106 is no, the processing unit 403 executes processing of S102 again.

FIG. 13 to FIG. 16 are conceptual diagrams illustrating a processing flow example of control processing, executed by the processing unit 403 illustrated in FIG. 1, of causing the brake unit 131a illustrated in FIG. 2 to make multi-stage contact with the head unit 136a.

As an assumption of processing illustrated in FIG. 13 to FIG. 16, it is assumed that the processing unit 403 sequentially generates the error information described above from a reproduction signal acquired by reproducing, by the head unit 136a illustrated in FIG. 2, information recorded on the tape 106a and stores the generated error information on the recording unit 405 of the processing unit 403 illustrated in FIG. 1.

First, the processing unit 403 starts processing illustrated in FIG. 12, for example, based on a reproduction start of information recorded on the tape 106a by the head unit 136a illustrated in FIG. 2.

The processing unit 403 reads, as processing of S201, the latest position error information from the recording unit 405 illustrated in FIG. 1 and determines whether the position error information falls within a predetermined range. The predetermined range is an allowable range of position error information previously set for the processing of S201 and processing of S213, S223, and S233 to be described later.

When a determination result based on the processing of S201 is yes, the processing unit 403 executes processing of S241.

On the other hand, when a determination result based on the processing of S201 is no, the processing unit 403 executes processing of S202.

When executing the processing of S202, the processing unit 403 determines, as the processing, whether the end portion 276a of the member 126a is in contact with the member 116a of the head unit 136a. The processing unit 403 executes the determination by determining whether, for example, the position setting unit 121a is set to bring the end portion 276a of the member 126a into contact with the member 116a of the head unit 136a.

When a determination result based on the processing of S202 is yes, the processing unit 403 executes processing of S203.

On the other hand, when a determination result based on the processing of S202 is no, the processing unit 403 executes processing of S210 to be described later with reference to FIG. 14 and thereafter executes processing of S241.

When executing processing of S203, the processing unit 403 determines, as the processing, whether a contact state of the end portion 276a with the member 116a is a level 1. A contact state of the level 1 is a relatively weak contact state. A contact state of the level 1 is a contact state illustrated, for example, in FIGS. 8(b) and (e), FIGS. 9(b) and (e), FIG. 10(b), and FIG. 11(b). The processing unit 403 executes the determination by determining whether, for example, the position setting unit 121a is set to cause a contact state to be the level 1.

When a determination result based on the processing of S203 is yes, the processing unit 403 executes processing of S220 to be described later with reference to FIG. 15 and thereafter executes the processing of S241.

On the other hand, when a determination result based on the processing of S203 is no, the processing unit 403 executes processing of S230 to be described later with reference to FIG. 16 and thereafter executes processing of S241. A case where a determination result based on the processing of S203 is no corresponds to a case where a contact state of the end portion 276a with the member 116a is a level 2. A contact state of the level 2 is a contact state stronger than a contact state of the level 1. A contact state of the level 2 is a contact state illustrated, for example, in FIGS. 8(c) and (f), FIGS. 9(c) and (f), FIG. 10(c), and FIG. 11(c). The processing unit 403 executes the determination by determining whether, for example, the position setting unit 121a is set to cause a contact state to be the level 2.

When executing the processing of S241, the processing unit 403 determines, as the processing, whether to terminate the processing illustrated in FIG. 13 to FIG. 16. The processing unit 403 executes the determination, for example, by determining a presence or absence of input of termination information. The termination information is input to the processing unit 403, for example, based on reproduction termination of information recorded on the tape 106a by the head unit 136a illustrated in FIG. 2.

When a determination result based on the processing of S241 is yes, the processing unit 403 terminates the processing illustrated in FIG. 13 to FIG. 16.

On the other hand, when a determination result based on the processing of S241 is no, the processing unit 403 executes processing of S201 again.

Figure 13:
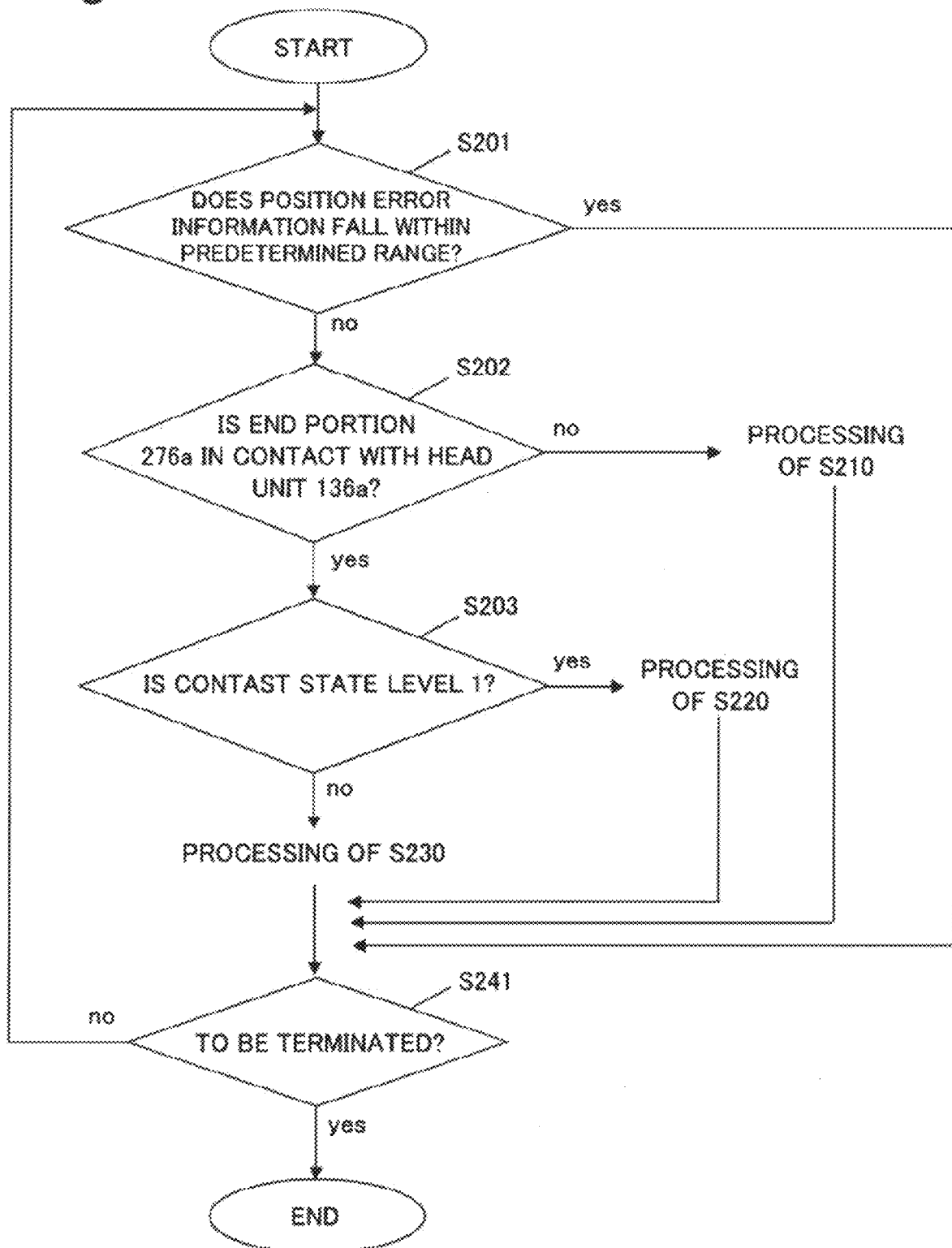
FIG. 13 is a conceptual diagram (No. 1) illustrating a processing flow example of control processing of bringing the brake unit into multistage contact with a head unit.
Figure 14:
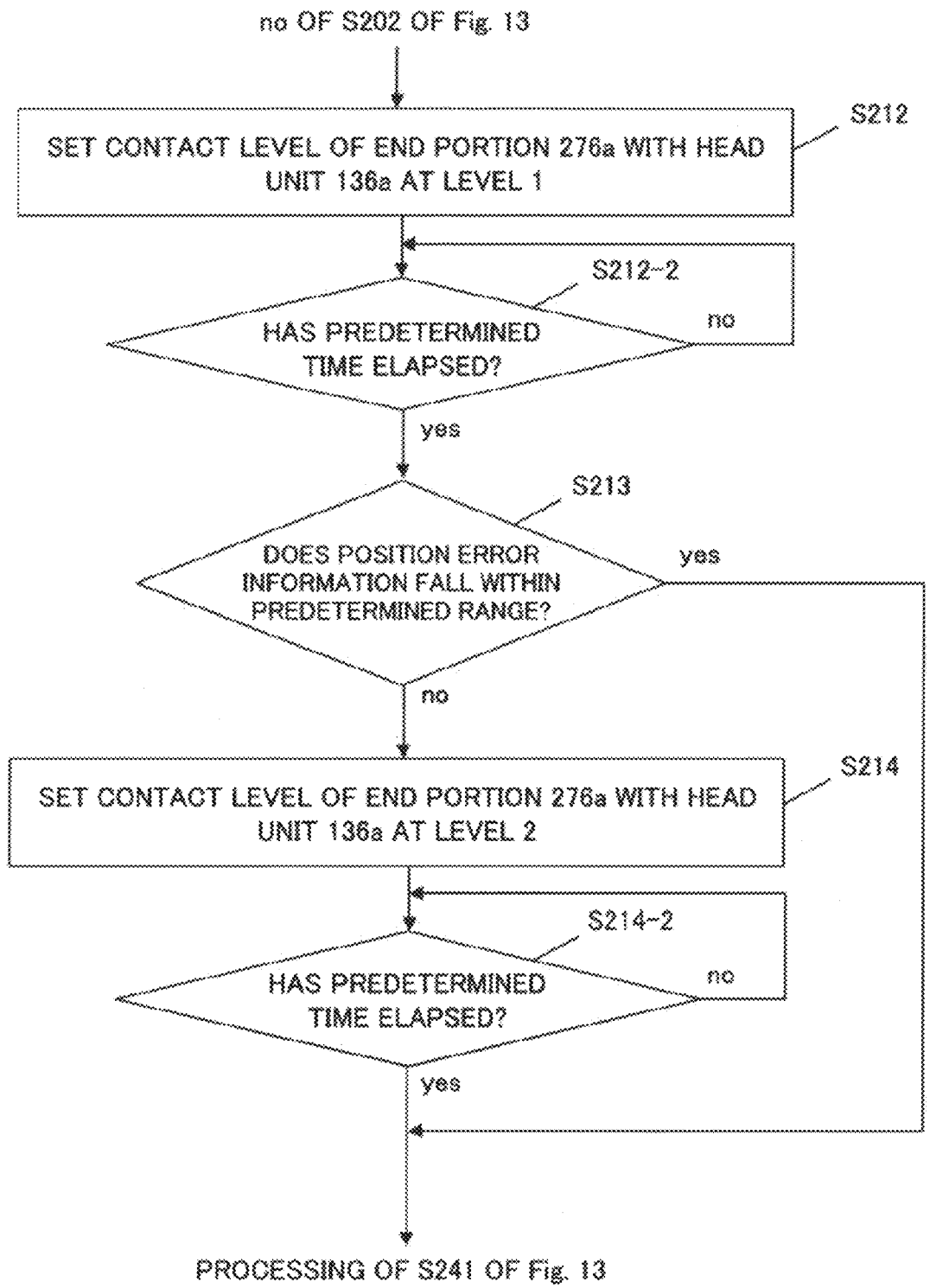
FIG. 14 is a conceptual diagram (No. 2) illustrating a processing flow example of control processing of bringing the brake unit into multistage contact with the head unit.

FIG. 14 is a conceptual diagram illustrating a processing flow example of the processing of S210 illustrated in FIG. 13.

The processing unit 403 first sets, as processing of S212, a contact level of an end portion of the member 126a with the member 116a of the head unit 136a at the level 1. The processing unit 403 executes the setting by setting the position setting unit 121a to cause a contact level of the end portion 276a with the member 116a to be the level 1.

The processing unit 403 determines, as processing of S212-2, whether a predetermined time has elapsed. S212-2 is processing to be executed for an intent of waiting for a state that a contact level of the end portion 276a with the head unit 136a actually becomes the level 1, in response to the processing of S212.

When a determination result based on the processing of S212-2 is yes, the processing unit 403 executes processing of S213.

On the other hand, when a determination result based on the processing of S212-2 is no, the processing unit 403 executes the processing of S212-2 again.

When executing the processing of S213, the processing unit 403 reads, as the processing, the latest position error information from the recording unit 405 illustrated in FIG. 1 and determines whether the position error information falls within the predetermined range described above.

When a determination result based on the processing of S213 is yes, the processing unit 403 executes the processing of S241 illustrated in FIG. 13.

On the other hand, when a determination result based on the processing of S213 is no, the processing unit 403 sets, as processing of S214, a contact level of the end portion 276a with the member 116a at the level 2. The processing unit 403 executes the setting by setting the position setting unit 121a to cause a contact level of the end portion 276a with the member 116a to be the level 2.

The processing unit 403 determines, as processing of S214-2, whether a predetermined time has elapsed. S214-2 is processing to be executed for an intent of waiting for a state that a contact level of the end portion 276a with the head unit 136a actually becomes the level 2, in response to the processing of S214.

When a determination result based on the processing of S214-2 is yes, the processing unit 403 executes the processing of S241 in FIG. 13.

On the other hand, when a determination result based on the processing of S214-2 is no, the processing unit 403 executes the processing of S214-2 again.

Figure 15:
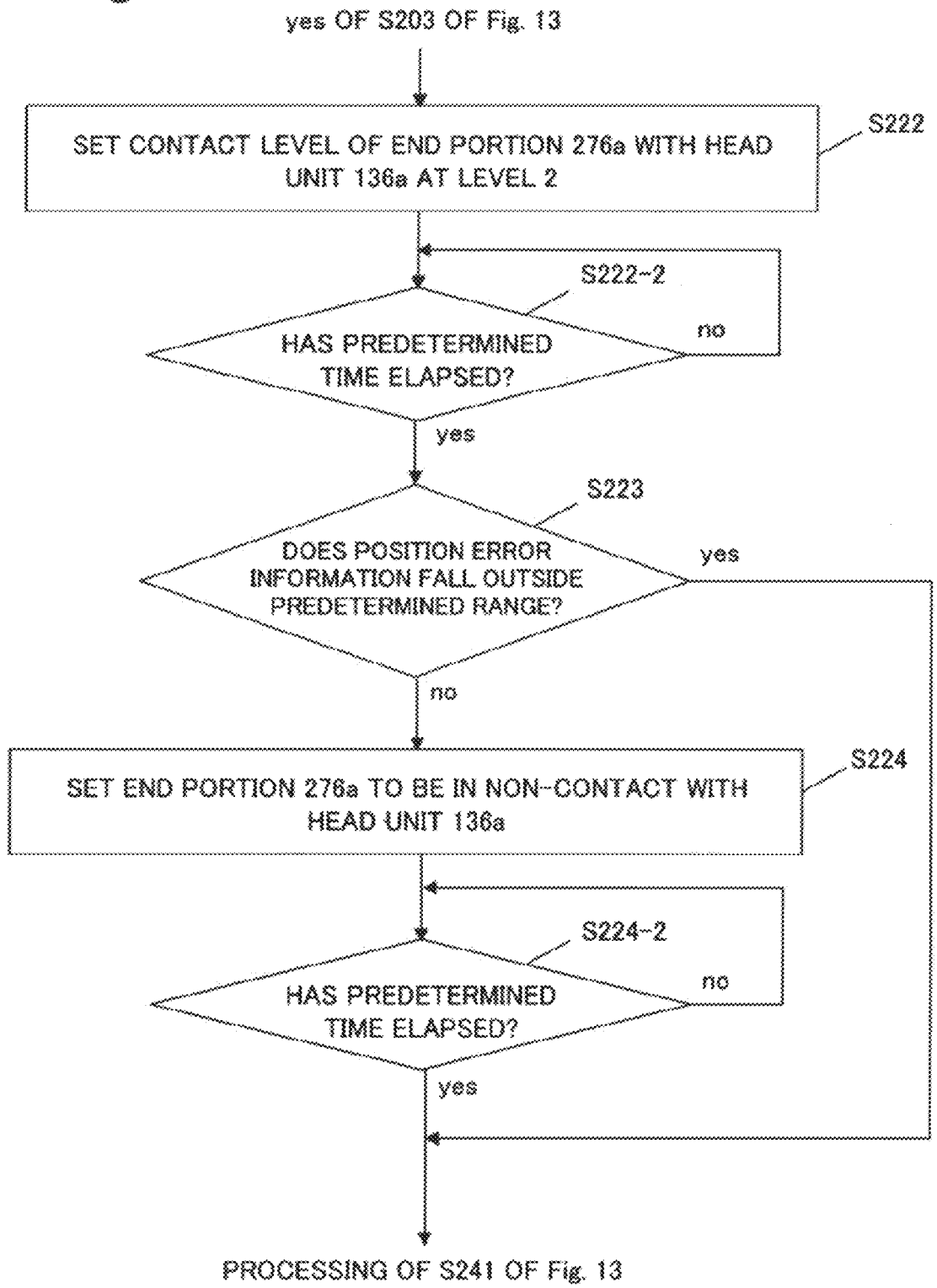
FIG. 15 is a conceptual diagram (No. 3) illustrating a processing flow example of control processing of bringing the brake unit into multistage contact with the head unit.

FIG. 15 is a conceptual diagram illustrating a processing flow example of processing of S220 illustrated in FIG. 13.

The processing unit 403 sets, as processing of S222 preceded by yes of S203 illustrated in FIG. 13, a contact level of the end portion 276a of the member 126a with the member 116a of the head unit 136a at the level 2. The processing unit 403 executes the setting by setting the position setting unit 121a to cause a contact level of the end portion 276a with the member 116a to be the level 2.

The processing unit 403 determines, as processing of S222-2, whether a predetermined time has elapsed. S222-2 is processing to be executed for an intent of waiting for a state that a contact level of the end portion 276a with the head unit 136a actually becomes the level 2, in response to the processing of S222.

When a determination result based on the processing of S222-2 is yes, the processing unit 403 executes processing of S223.

On the other hand, when a determination result based on the processing of S222-2 is no, the processing unit 403 executes the processing of S222-2 again.

When executing processing of S223, the processing unit 403 reads, as the processing, the latest position error information from the recording unit 405 illustrated in FIG. 1 and determines whether the position error information falls within the predetermined range described above.

When a determination result based on the processing of S223 is yes, the processing unit 403 executes the processing of S241 illustrated in FIG. 13.

On the other hand, when a determination result based on the processing of S223 is no, the processing unit 403 sets the end portion 276a and the member 116a to be in non-contact with each other. The processing unit 403 executes the setting by setting the position setting unit 121a to cause the end portion 276a and the member 116a to be in non-contact with each other.

The processing unit 403 determines, as processing of S224-2, whether a predetermined time has elapsed. S224-2 is processing to be executed for an intent of waiting for a state that the end portion 276a and the head unit 136a are actually in non-contact with each other, in response to the processing of S224.

When a determination result based on the processing of S224-2 is yes, the processing unit 403 executes the processing of S241 illustrated in FIG. 13.

On the other hand, when a determination result based on the processing of S224-2 is no, the processing unit 403 executes the processing of S224-2 again.

Figure 16:
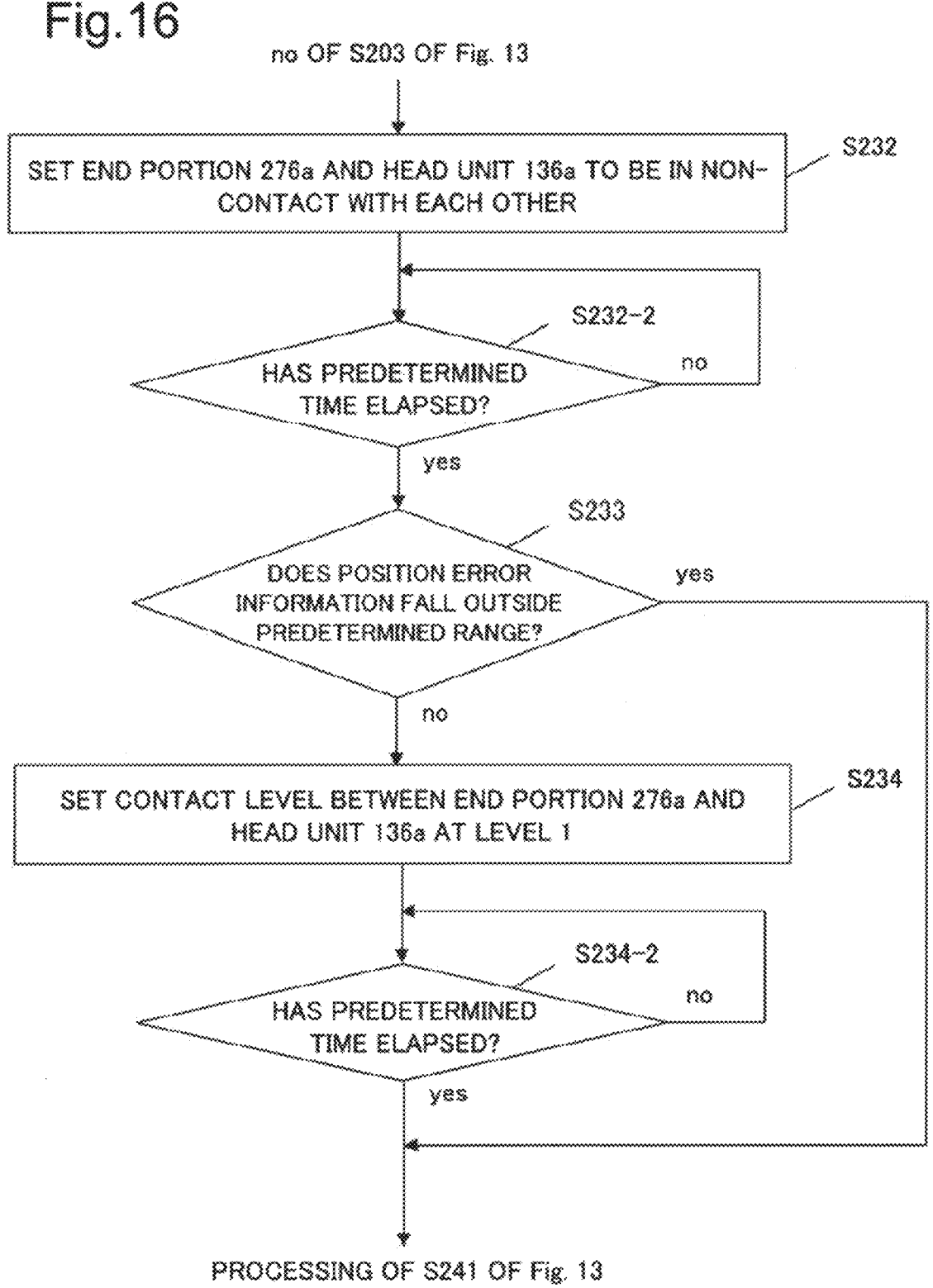
FIG. 16 is a conceptual diagram (No. 4) illustrating a processing flow example of control processing of bringing the brake unit into multistage contact with the head unit.

FIG. 16 is a conceptual diagram illustrating a processing flow example of processing of S230 illustrated in FIG. 13.

The processing unit 403 sets, as processing of S232 preceded by no of S203 illustrated in FIG. 13, the end portion 276a and the member 116a to be in non-contact with each other. The processing unit 403 executes the setting by setting the position setting unit 121a to cause the end portion 276a and the member 116a to be in non-contact with each other.

The processing unit 403 determines, as processing of S232-2, whether a predetermined time has elapsed. S232-2 is processing to be executed for an intent of waiting for a state that the end portion 276a and the head unit 136a are actually in non-contact with each other, in response to the processing of S232.

When a determination result based on the processing of S232-2 is yes, the processing unit 403 executes processing of S233.

On the other hand, when a determination result based on the processing of S232-2 is no, the processing unit 403 executes the processing of S232-2 again.

As the processing of S233, the latest position error information is read from the recording unit 405 illustrated in FIG. 1, and it is determined whether the position error information falls within the predetermined range described above.

When a determination result based on the processing of S233 is yes, the processing unit 403 executes the processing of S241 illustrated in FIG. 13.

On the other hand, when a determination result based on the processing of S233 is no, the processing unit 403 sets, as processing of S234, a contact state of the end portion 276a with the member 116a to be the level 1. The processing unit 403 executes the setting by setting the position setting unit 121a to cause a contact level of the end portion 276a with the member 116a to be the level 1.

The processing unit 403 determines, as processing of S234-2, whether a predetermined time has elapsed. S234-2 is processing to be executed for an intent of waiting for a state that a contact state of the end portion 276a with the head unit 136a actually becomes the level 1, in response to the processing of S234.

When a determination result based on the processing of S234-2 is yes, the processing unit 403 executes the processing of S241 illustrated in FIG. 13.

On the other hand, when a determination result based on the processing of S234-2 is no, the processing unit 403 executes the processing of S234-2 again.

Specific Example

Hereinafter, a specific example in which the brake unit of the present example embodiment is applied to a magnetic tape device is described.

Figure 17:
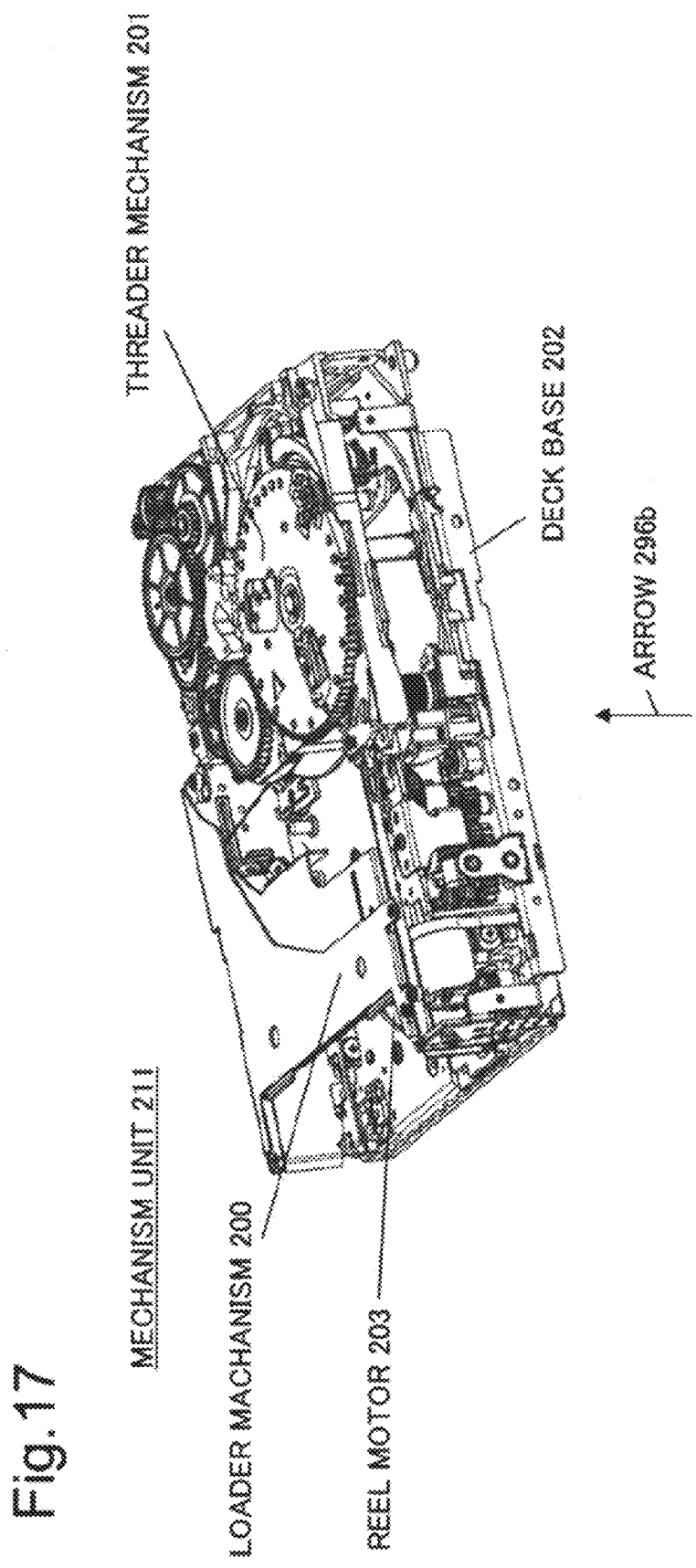
FIG. 17 is a perspective diagram illustrating a specific example of a mechanism unit of a magnetic tape device.

FIG. 17 is a perspective diagram illustrating a mechanism unit 211 that is a specific example of a mechanism unit of a magnetic tape device.

The mechanism unit 211 is a portion including the drive unit 404 illustrated in FIG. 1.

The mechanism unit 211 includes a loader mechanism 200, a threader mechanism 201, a reel motor 203, and a deck base 202.

The loader mechanism 200 is a portion that conveys a magnetic tape cartridge accommodating a magnetic tape to an inside of the mechanism unit 211.

The threader mechanism 201 is a mechanism that conveys a magnetic tape of a magnetic tape cartridge to a reel placed in the mechanism unit 211. The reel motor 203 is a reel motor for rotating a reel in a magnetic tape cartridge. Although being not illustrated in FIG. 17, the mechanism unit 211 separately includes a reel motor for rotating a reel included in the mechanism unit 211.

The deck base 202 is a base part for placing components of the mechanism unit 211, a head unit, a brake unit, and a control board.

Figure 18:
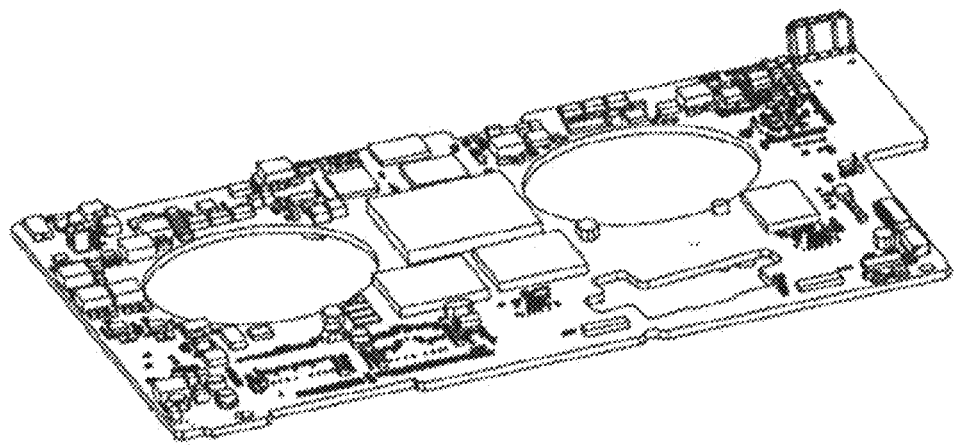
FIG. 18 is a diagram illustrating a specific example of a control board.

FIG. 18 is a diagram illustrating a control board 102 that is a specific example of a control board of a magnetic tape device.

The control unit 402 and the processing unit 403 illustrated in FIG. 1 include, as a hardware configuration, parts included in the control board 102. It is assumed that the control board 102 is placed on a back side (a side indicated by an arrow 296b) of the mechanism unit 211 illustrated in FIG. 17.

Figure 19:
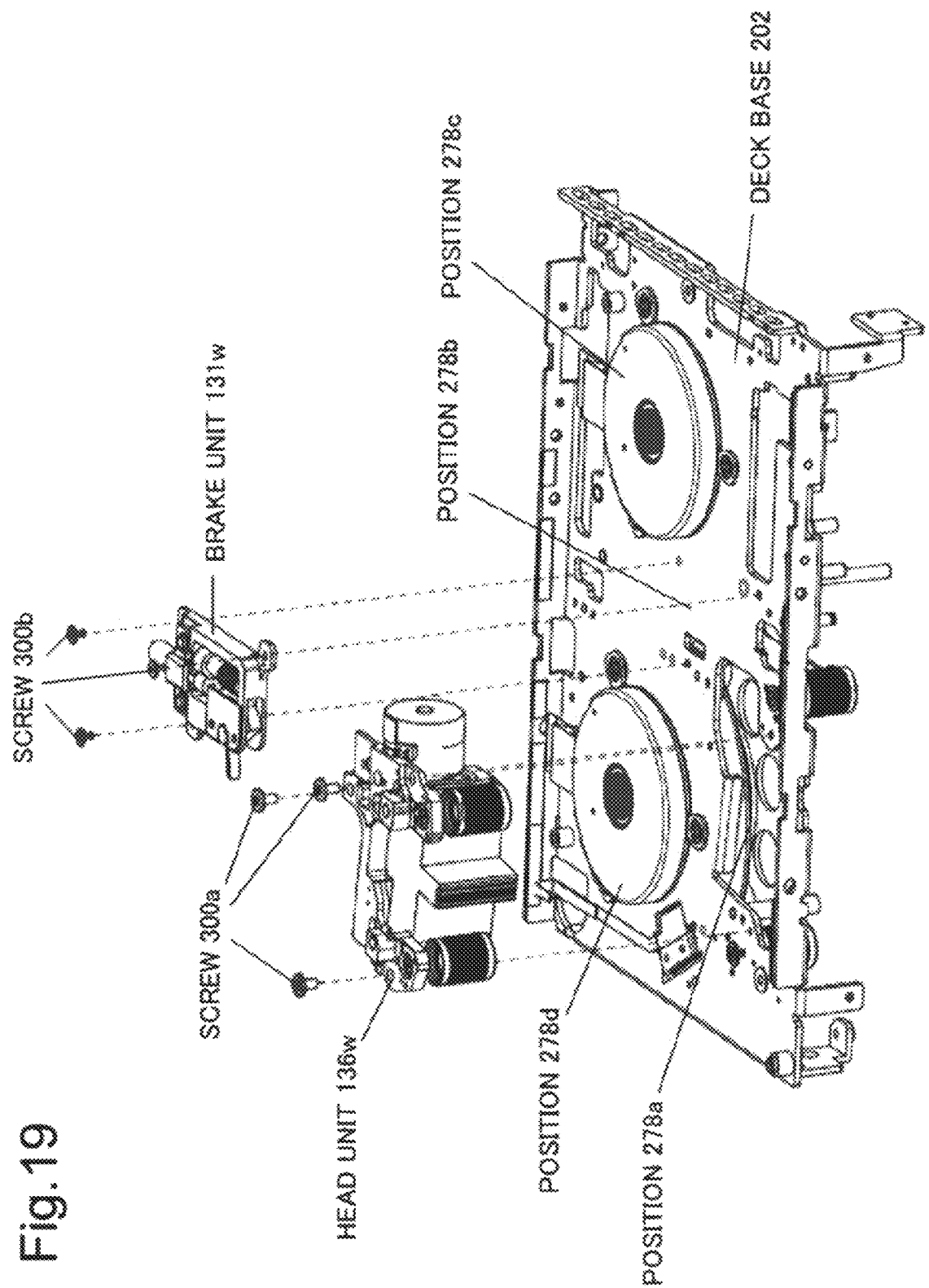
FIG. 19 is a perspective diagram illustrating a specific example of a brake unit, a head unit, a deck base.

FIG. 19 is a perspective diagram illustrating a brake unit 131w, a head unit 136w, and the deck base 202 illustrated in FIG. 17, indicating a specific example of a brake unit, a head unit, and a deck base unit.

With regard to the deck base 202 illustrated in FIG. 19, it is assumed that a direction (a back side) of the arrow 296b of the mechanism unit 211 illustrated in FIG. 17 is viewed. The deck base 202 is a specific example of a common member, not illustrated, described upon description with reference to FIG. 2.

The brake unit 131w is a specific example of the brake unit 131a illustrated in FIG. 2. A detailed configuration of the brake unit 131w is described later.

The head unit 136w is a specific example of the head unit 136a illustrated in FIG. 2.

It is assumed that the head unit 136w is fitted in a position 278a of the deck base 202 and is fixed by a screw 300a.

It is assumed that the brake unit 131w is placed on a position 278b of the deck base 202 and fixed by a screw 300b.

Note that a position 278c is a position in which it is assumed that the reel motor 203 illustrated in FIG. 17 is placed from an underside of the deck base 202 in a way of viewing illustrated in FIG. 19.

Further, a position 278d is a position in which it is assumed that a reel motor for rotating a reel included in the mechanism unit 211 is placed from a back side of the deck base 202 in a way of viewing illustrated in FIG. 18.

Figure 20:
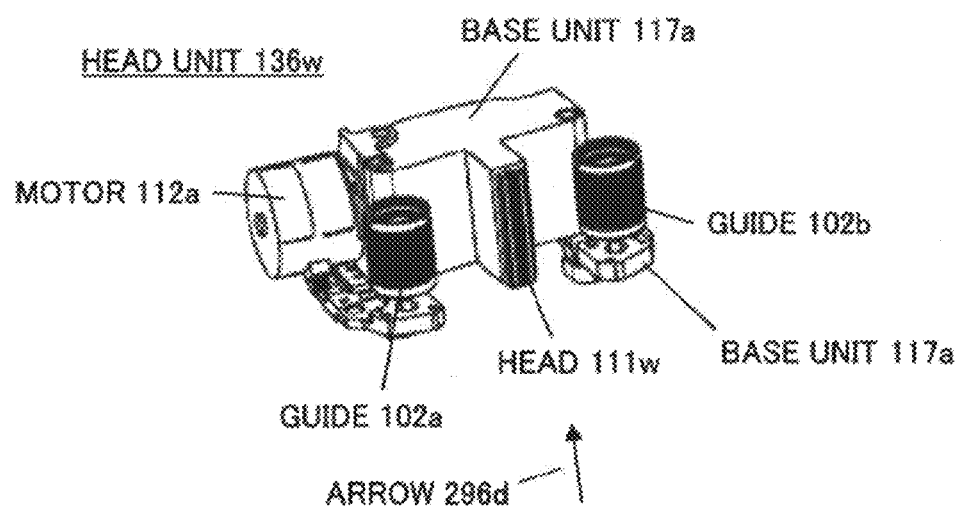
FIG. 20 is a diagram illustrating a head unit 136w.

FIG. 20 is a diagram illustrating the head unit 136w illustrated in FIG. 19.

The head unit 136w includes a head 111w, guides 102a and 102b, a motor 112a, and a base unit 117a.

The head 111w is a member corresponding to the head 111a illustrated in FIG. 2.

It is assumed that a magnetic tape that is not illustrated passes from left to right or from right to left on a front side upon facing FIG. 20 of the guide 102a, the head 111w, and the guide 102b. The head 111a converts, when the magnetic tape passes, magnetic information recorded on the magnetic tape to an electric signal. The head 111w transmits the converted electric signal to a portion corresponding to the processing unit 403 illustrated in FIG. 1 of the control board 102 illustrated in FIG. 18.

The head unit 136w includes a mechanism (height modification mechanism) that modifies a height (a distance of a direction parallel to an arrow 296d illustrated in FIG. 20) of the head 111w, other than the configuration, however, being not viewed in FIG. 20. The head 111w is fixed on the height modification mechanism. The head unit 136w drives the motor 112a and thereby can modify a height of the head 111w on the height modification mechanism.

The base unit 117a is a base part where the head 111w, the guides 102a and 102b, and the motor 112a are placed.

The base unit 117a, the guides 102a and 102b, the motor 112a, and the height modification mechanism described above correspond to the member 116a illustrated in FIG. 2.

Figure 21:
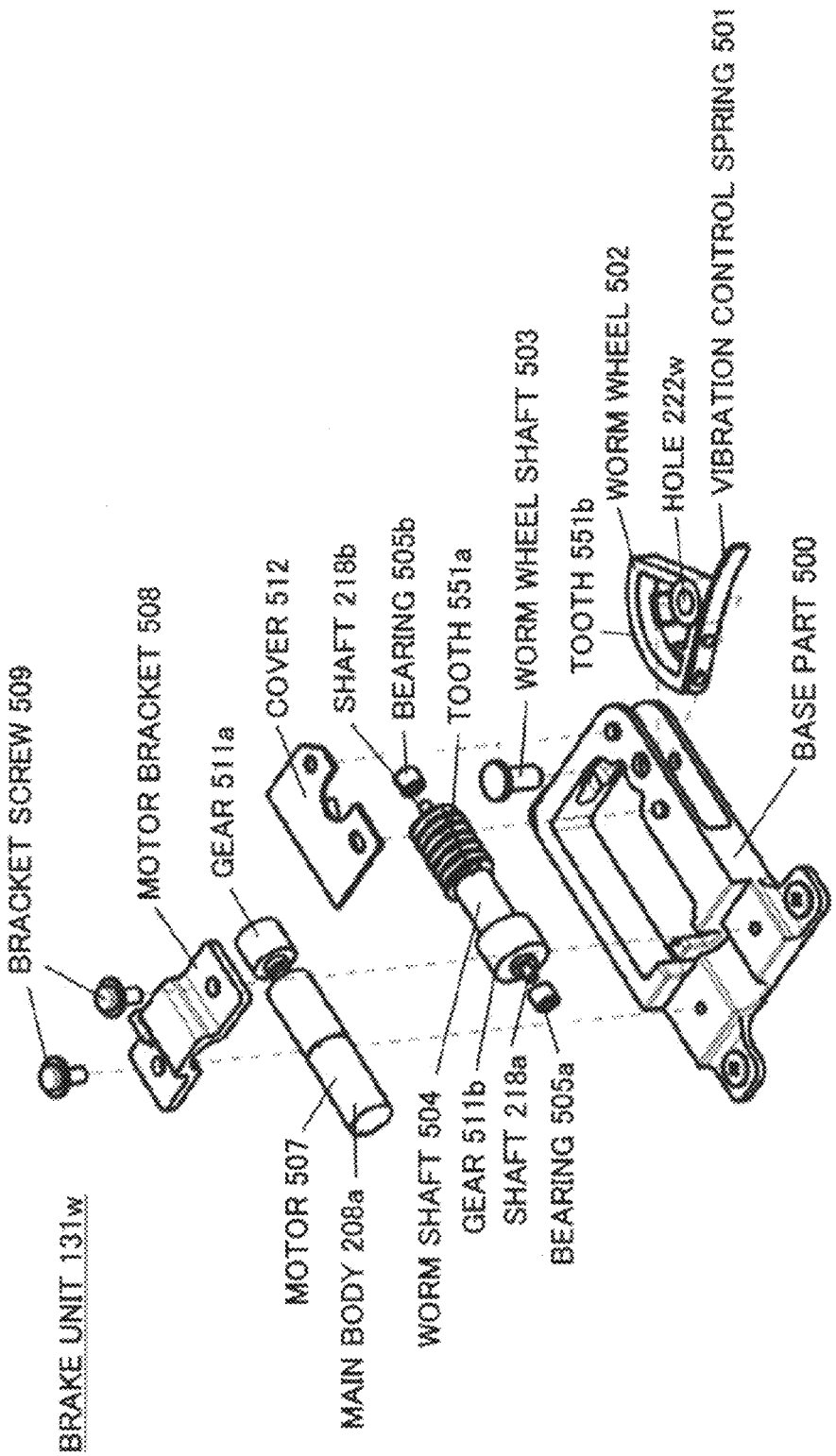
FIG. 21 is an exploded view of a brake unit 131w.

FIG. 21 is an exploded view of the brake unit 131w illustrated in FIG. 19. The brake unit 131w is a specific example using the position setting unit 166b illustrated in FIG. 4 through an application.

The brake unit 131w includes a bracket screw 509, a motor bracket 508, a motor 507 and a cover 512, and a worm shaft 504. The brake unit 131w further includes bearings 505a and 505b, a worm wheel shaft 503, a worm wheel 502, and a base part 500.

It is assumed that a main body 208a of the motor 507 is fixed to the base part 500 by the motor bracket 508 and the bracket screw 509. The main body 208a rotationally drives the gear 511a with power supplied from a power supply that is not illustrated.

The worm shaft 504 includes a gear 511b and a tooth 551a, and shafts 218a and 218b.

It is assumed that the shafts 218a and 218b are inserted in the bearings 505a and 505b, respectively, assumed to be fixed to the base part 500. The worm shaft 504 can rotate in a circumferential direction.

It is assumed that the gear 511b is engaged with the gear 511a of the motor 507 while the motor 507 and the worm shaft 504 are placed on the base part 500. The motor 507 rotationally drives the gear 511a in such a state and thereby can rotationally drive the worm shaft 504.

The tooth 551a is a spiral tooth.

The worm wheel 502 includes a tooth 551b, a hole 222w, and a vibration control spring 501.

The worm wheel 502 is placed on the base part 500 by the worm wheel shaft 503 while the worm wheel shaft 503 is inserted in the hole 222w. In such a state, the worm wheel 502 can rotate around the worm wheel shaft 503.

The tooth 551b is engaged with the tooth 551a having a spiral shape of the worm shaft 504 while the motor 507, the worm shaft 504, and the worm wheel 502 are placed on the base part 500.

The vibration control spring 501 is fixed to a vicinity of the hole 222w of the worm wheel 502.

The brake unit 131w drives the motor 507 by using a power supply that is not illustrated and thereby can rotate the vibration control spring 501 of the worm wheel 502 around the worm wheel shaft 503.

Note that a rotation angle of the worm wheel 502 can be adjusted, for example, by a rotation amount of the motor 507. Alternatively, a rotation angle of the worm wheel 502 may be adjusted by placing an optical sensor that is not illustrated.

The brake unit 131w is downsized by making a structure where the tooth 551a having a spiral shape of the worm shaft 504 and the tooth 551b of the worm wheel 502 are engaged with each other.

Figure 22:
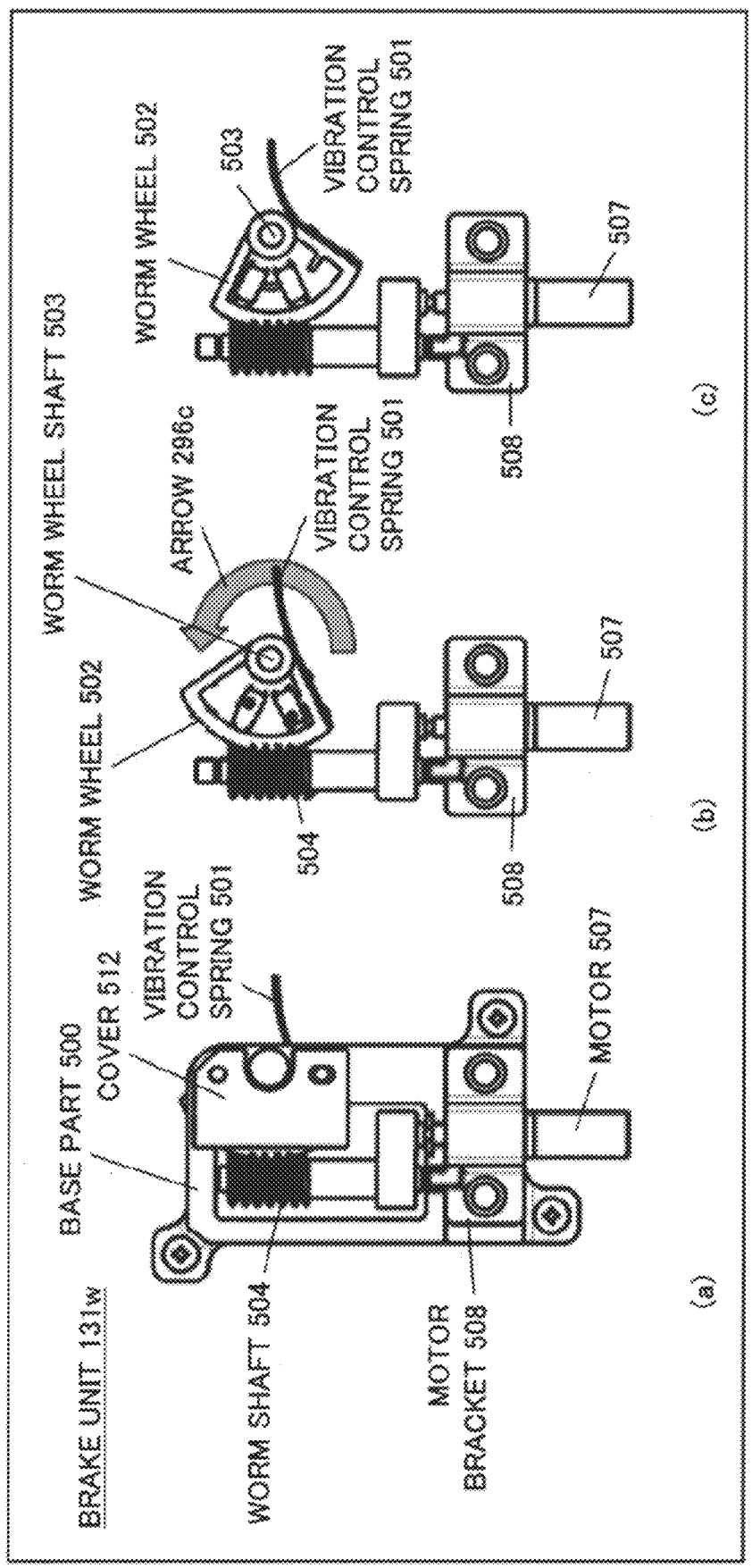
FIG. 22 is an illustrative view of an operation of the brake unit 131w.

FIG. 22 is an illustrative view of an operation of the brake unit 131w illustrated in FIG. 21.

FIG. 22(a) is a diagram illustrating a state where the brake unit 131w is assembled.

FIGS. 22(b) and (c) are diagrams illustrating a state where the brake unit 131w is assembled without illustrating the cover 512 nor the base part 500.

The brake unit 131w switches a position of the vibration control spring 501 to two stages of a first position illustrated in FIG. 22(b) and a second position illustrated in FIG. 22(c). The motor 507 is driven and the worm wheel 502 is rotated by a predetermined angle in a direction of an arrow 296c from the first position illustrated in FIG. 22(b), and thereby the vibration control spring 501 is located at the second position illustrated in FIG. 22(c).

Figure 23:
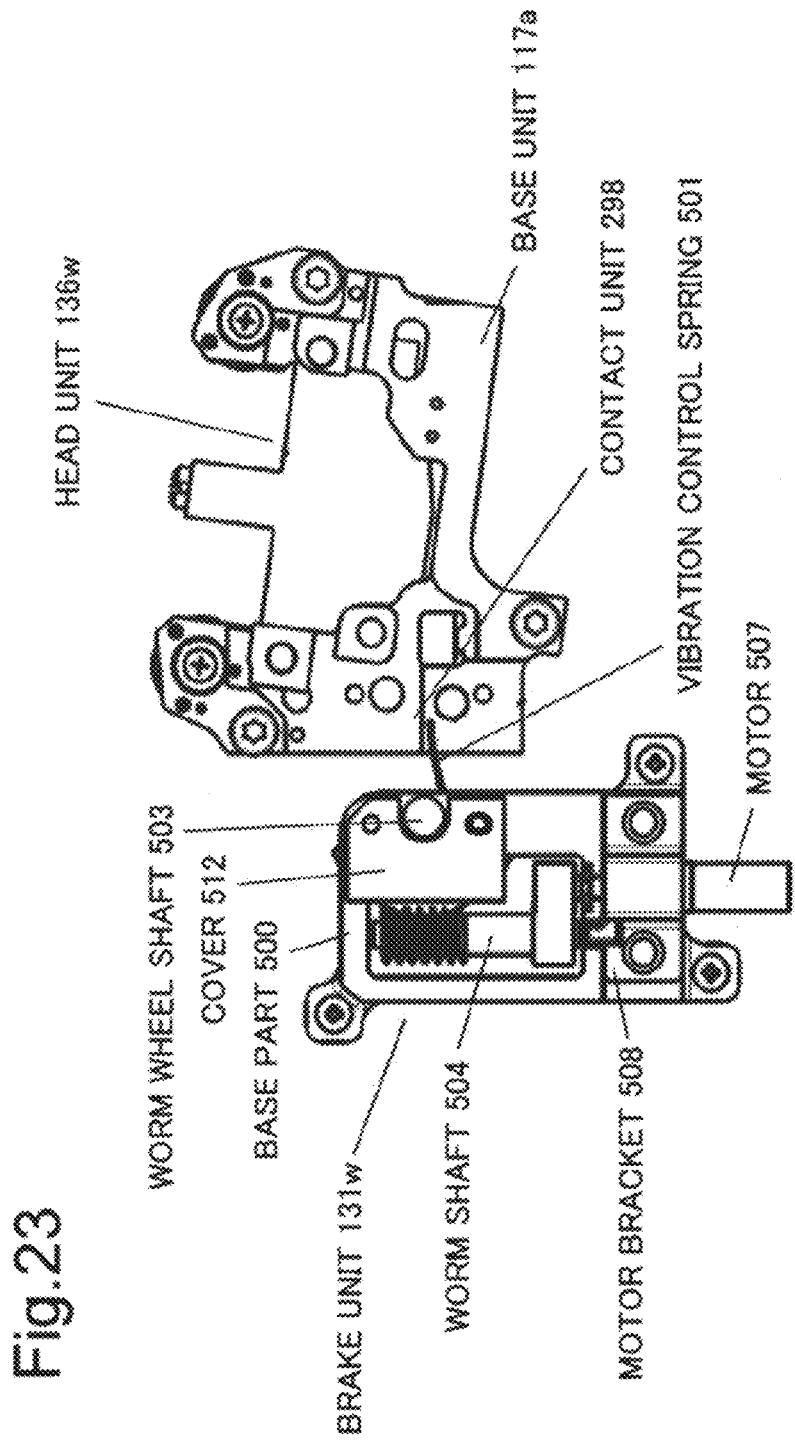
FIG. 23 is a diagram (No. 1) illustrating an operation of the brake unit 131w while the brake unit 131w and the head unit 136w are placed on a deck base 202.
Figure 24:
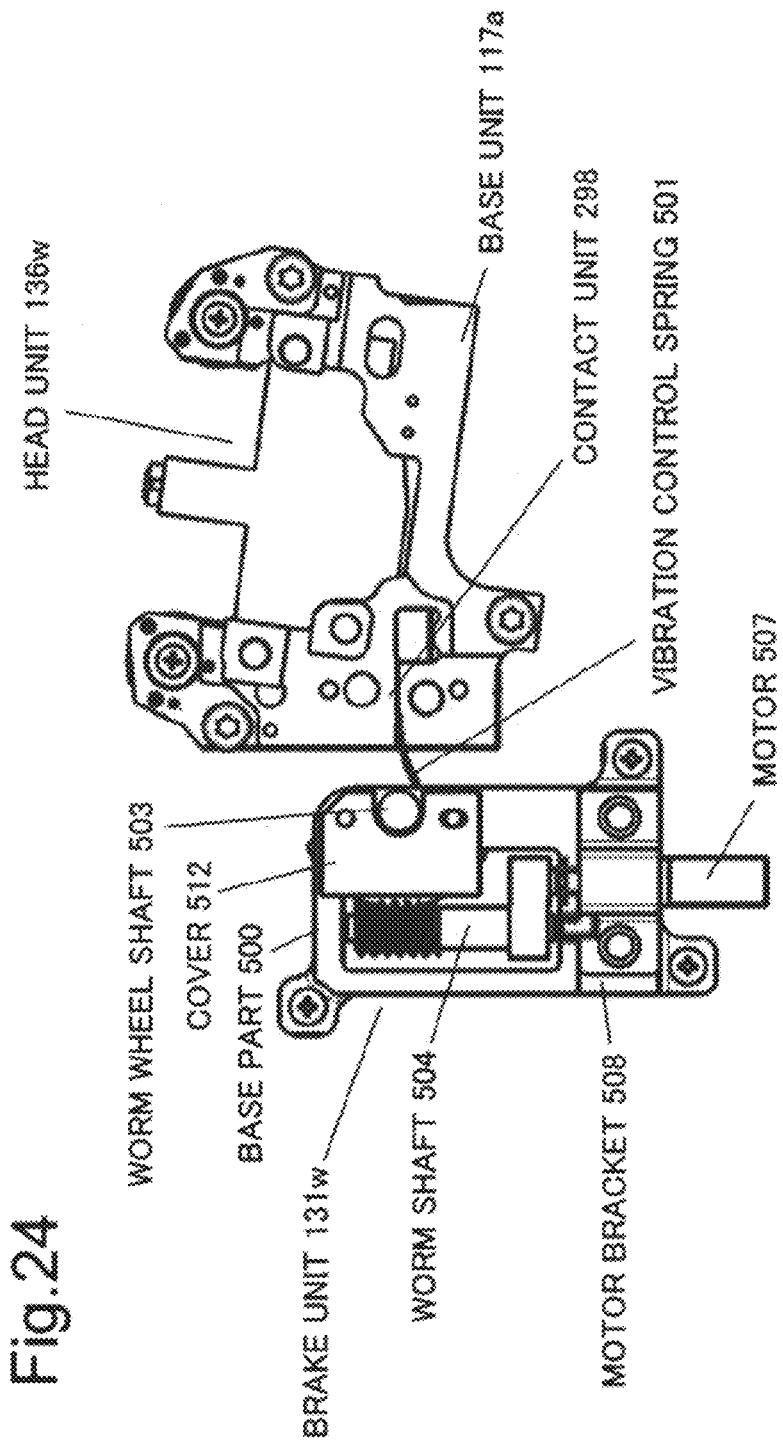
FIG. 24 is a diagram (No. 2) illustrating an operation of the brake unit 131w while the brake unit 131w and the head unit 136w are placed on the deck base 202.

FIGS. 23 and 24 are diagrams illustrating an operation of the brake unit 131w while the brake unit 131w and the head unit 136w illustrated in FIG. 19 are placed on the deck base 202. However, in FIGS. 23 and 24, display of the deck base 202 is omitted. FIGS. 23 and 24 are diagrams in which it is assumed that a direction (back side) of the arrow 296d illustrated in FIG. 20 is viewed with regard to the head unit 136w.

FIG. 23 illustrates a state where the vibration control spring 501 illustrated in FIGS. 22(a) and (b) is located in the first position described above. In such a state, the vibration control spring 501 is separated from a contact unit 298 of the base unit 117a in the head unit 136w.

FIG. 24 illustrates a state where the vibration control spring 501 illustrated in FIG. 22(c) is located in the second position described above. In such a state, the vibration control spring 501 is in contact with the contact unit 298 of the base unit 117a in the head unit 136w.

As described above, the recording/reproduction device of the present example embodiment has been described mainly with respect to an example of a recording/reproduction device that reproduces, by using a head, magnetic information recorded on a magnetic tape. However, the recording/reproduction device of the present example embodiment may be another recording/reproduction device when being a recording/reproduction device including a similar configuration and having a similar issue. The another recording/reproduction device is, for example, an optical disc device that executes, by using an optical head, reproduction and the like of information recorded on an optical disc.

Advantageous Effect

The brake unit of the present example embodiment modifies a contact state of a brake member with a head unit when an error between a position on a recording medium read by a head and a position at which information is recorded in the recording medium exceeds a predetermined range due to a vibration or wobbling occurring in the head unit. A modification of the contact state includes a modification from a state of being in non-contact to a state of being in contact, a modification from a state of being in contact to a state of being in non-contact, and a modification of a contact level.

Through a modification of the contact state, for example, by modifying a resonance frequency of a vibration in which the error is a cause of exceeding a predetermined range, it may be possible that the vibration disappears and the error becomes small. Alternatively, through a modification of the contact state, it may be possible that a wobbling of the head unit is reduced and the error becomes small.

Therefore, the vibration control unit can improve the error by modifying the contact state.

Note that, when the vibration control unit switches the contact state at three stages or more, a possibility that the contact state capable of reducing the vibration or the wobbling can be selected increases. Therefore, the vibration control unit can further increase a possibility that the error can be improved, by modifying the contact state.

Figure 25:
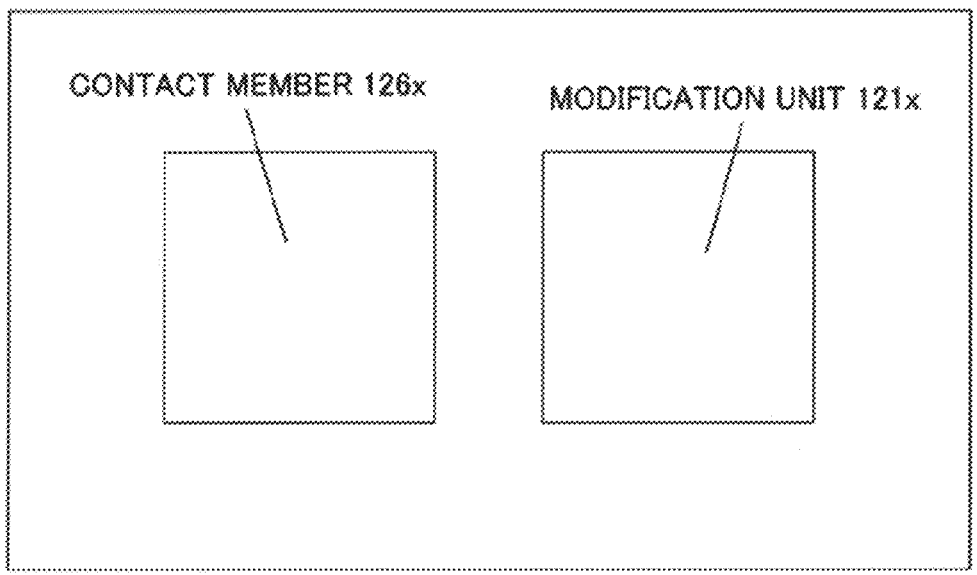
FIG. 25 is a block diagram illustrating a minimum configuration of a brake mechanism of the present invention.

FIG. 25 is a block diagram illustrating a configuration of a brake mechanism 131x that is a minimum brake mechanism of the present invention.

The brake mechanism 131x includes a contact member 126x and a modification unit 121x.

The contact member 126x can be brought into contact with a head unit, not illustrated, that reads recorded information of a recorded information stream recorded on a medium, not illustrated, that moves relative to the head unit.

The modification unit 121x modifies, when information representing a displacement between a position read by the head unit in the medium and a position of the recorded information stream exceeds a predetermined range, a contact state of the contact member with the head unit.

It is assumed that, for example, the displacement is occurring due to a vibration of the head. In this case, a vibration of the head is reduced by modifying the contact state and thereby the displacement can be reduced.

Further, it is assumed that, for example, the displacement is occurring due to a wobbling of the head. In this case, a wobbling of the head is reduced by modifying the contact state and thereby the displacement can be improved.

Therefore, the brake mechanism 131x may reduce the displacement by modifying a modification of a contact state of the contact member with the head unit.

Therefore, the brake mechanism 131x produces an advantageous effect described in the section of [Advantageous Effect], by using the above-described configuration.

While example embodiments of the present invention have been described, the present invention is not limited to the above-described example embodiments and further variations, substitutions, and adjustments may be added without departing from the basic technical idea of the present invention. For example, a configuration of elements illustrated in the drawings is one example for helping understanding of the present invention and is not limited to the configuration illustrated in these drawings.

The whole or part of the example embodiments disclosed above can be described as, but not limited to, the following supplementary notes.

Supplementary Note 1

A brake mechanism including:
a contact member that can be brought into contact with a head unit for reading recorded information of a recorded information stream recorded on a medium that moves relatively; and
a modification means that modifies a contact state of the contact member with the head unit when information representing a displacement between a position read by the head unit in the medium and a position of the recorded information stream exceeds a predetermined range.

Supplementary Note 2

The brake mechanism according to supplementary note 1, wherein
a modification of the contact state includes a modification of presence or absence of contact of the contact member with the head unit.

Supplementary Note 3

The brake mechanism according to supplementary note 1 or 2, wherein
a modification of the contact state includes a modification of a contact level of the contact member with the head unit.

Supplementary Note 4

The brake mechanism according to any one of supplementary notes 1 to 3, wherein
the contact state includes three stages or more.

Supplementary Note 5

The brake mechanism according to any one of supplementary notes 1 to 4, wherein
the contact member has enough elasticity to be deformed by contact with the head unit.

Supplementary Note 6

The brake mechanism according to any one of supplementary notes 1 to 5, wherein
the contact member includes a spring.

Supplementary Note 7

The brake mechanism according to supplementary note 6, wherein
the spring is a plate spring.

Supplementary Note 8

The brake mechanism according to any one of supplementary notes 1 to 7, wherein
the contact member is placed in the modification means and a modification of the contact state is executed by causing the modification means to modify a distance between a portion at which the contact member of the modification means is placed and the head unit.

Supplementary Note 9

The brake mechanism according to any one of supplementary notes 1 to 8, wherein
the modification means includes a substrate, a rotary drive means that is placed on the substrate and is able to rotationally drive a gear, and a movable portion including a tooth engaged with the gear while the tooth is placed on the substrate, and
the contact member is placed on the movable portion.

Supplementary Note 10

The brake mechanism according to any one of supplementary notes 1 to 8, wherein
the modification means includes a substrate, a rotary drive means placed on the substrate, a rotary shaft that is rotated in a circumferential direction by the rotary drive means while the rotary shaft is placed on the substrate and includes a spiral tooth, and a movable portion that includes a tooth engaged with the spiral tooth, is placed on the substrate, and can move relative to the substrate, and
the contact member is placed on the movable portion.

Supplementary Note 11

The brake mechanism according to supplementary note 10, wherein
the movable portion is a rotary portion that can rotate relative to the substrate.

Supplementary Note 12

The brake mechanism according to any one of supplementary notes 1 to 11, wherein
information representing the displacement is position error information derived from a signal acquired by reading the recorded information.

Supplementary Note 13

The brake mechanism according to any one of supplementary notes 1 to 12, wherein
there is a case where a vibration of the head unit is reduced by modifying the contact state.

Supplementary Note 14

The brake mechanism according to any one of supplementary notes 1 to 13, wherein
there is a case where a resonance frequency of the head unit is modified by modifying the contact state.

Supplementary Note 15

The brake mechanism according to any one of supplementary notes 1 to 14, wherein
there is a case where a wobbling of the head unit is reduced by modifying the contact state.

Supplementary Note 16

The brake mechanism according to any one of supplementary notes 1 to 15, wherein
the medium is a magnetic tape.

Supplementary Note 17

The brake mechanism according to any one of supplementary notes 1 to 15, wherein
the medium is an optical disc.

Supplementary Note 18

A head structure including:
the brake mechanism according to any one of supplementary notes 1 to 17; and
the head unit.

Supplementary Note 19

A recording/reproduction device including:
the head structure according to supplementary note 18;
a processing means that processes the read recorded information; and
a drive means that moves the medium relative to the head unit.

Supplementary Note 20

A brake method including
modifying a contact state of a contact member that can be brought into contact with a head unit with the head unit when information representing a displacement between a position read by the head unit in a medium read by the head unit that reads recorded information of a recorded information stream recorded on the medium that moves relatively, and a position of the recorded information stream exceeds a predetermined range.

Supplementary Note 21

A brake program that causes a computer to execute processing of modifying a contact state of a contact member that can be brought into contact with a head unit with the head unit when information representing a displacement between a position read by the head unit in a medium read by the head unit that reads recorded information of a recorded information stream recorded on the medium that moves relatively, and a position of the recorded information stream exceeds a predetermined range.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-230760 filed on Nov. 29, 2016, the disclosure of which is incorporated herein in its entirety by reference.

REFERENCE SIGNS LIST

101*a*, 101*b*, 102*a*, 102*b* Guide
102 Control board
106*a* Tape
108*a* Recording/reproduction unit
111*a* Head
112*a* Motor 121a, 166ab, 166b Position setting unit
116a, 126a, 126b, 126c, 126d, 126e, 127a, 211b, 211c, 211e, 211f, 211g Member
117a Base unit
121x Modification unit
126x Contact member
131, 131a, 131w Brake unit
131x Brake mechanism
136, 136a, 136w Head unit
146b Substrate
278a, 278b, 278c, 278d Position
197b, 197e, 276a End portion
200 Loader mechanism
201 Threader mechanism
202 Deck base
203 Reel motor
208a Main body
211 Mechanism unit
213a Drive unit
214a Fitting unit
215a Fitting groove
216a, 216b, 216d Tooth
217a, 217b, 217c, 218a, 218b Shaft
219a Gear unit
197c, 197d, 197e, 276a, 281a, 281b, 281c, 281d End portion
222w Hole
286 Line
291a, 291b Position
199a, 199b, 199c, 199h, 199i, 296a, 199b, 199c, 296a, 296b, 296c, 296d Arrow
212a, 212b Gear
221a Stopper
222a Hole
271a Side portion
281a Length
298 Contact unit
300a, 300b Screw
401, 401a Recording/reproduction mechanism
402 Control unit
403 Processing unit
213b, 404 Drive unit
405 Recording unit
411 Recording/reproduction device
500 Base part
501 Vibration control spring
502 Worm wheel
503 Worm wheel shaft
504 Worm shaft
505a, 505b Bearing
507 Motor
508 Motor bracket
509 Bracket screw
511a, 511b Gear
512 Cover
551a, 551b Tooth

What is claimed is:

1. A brake mechanism including:
a contact member that is configured to be brought into contact with a head for reading recorded information of a recorded information stream recorded on a medium that moves relatively; and
a modifier that modifies a contact state of the contact member with the head when information representing a displacement between a position read by the head in the medium and a position of the recorded information stream exceeds a predetermined range.

2. The brake mechanism according to claim 1, wherein a modification of the contact state includes a modification of presence or absence of contact of the contact member with the head.

3. The brake mechanism according to claim 1, wherein a modification of the contact state includes a modification of a contact level of the contact member with the head.

4. The brake mechanism according to claim 1, wherein the contact state includes three stages or more.

5. The brake mechanism according to claim 1, wherein the contact member has enough elasticity to be deformed by contact with the head.

6. The brake mechanism according to claim 1, wherein the contact member includes a spring.

7. The brake mechanism according to claim 6, wherein the spring is a plate spring.

8. The brake mechanism according to claim 1, wherein the contact member is placed in the modifier and a modification of the contact state is executed by causing the modifier to modify a distance between a portion at which the contact member of the modifier is placed and the head.

9. The brake mechanism according to claim 1, wherein the modifier includes a substrate, a rotary driver that is placed on the substrate and is able to rotationally drive a gear, and a movable portion including a tooth engaged with the gear while the tooth is placed on the substrate, and
the contact member is placed on the movable portion.

10. The brake mechanism according to claim 1, wherein the modifier includes a substrate, a rotary driver placed on the substrate, a rotary shaft that is rotated in a circumferential direction by the rotary driver while the rotary shaft is placed on the substrate and includes a spiral tooth, and a movable portion that includes a tooth engaged with the spiral tooth, is placed on the substrate, and is configured to move relative to the substrate, and
the contact member is placed on the movable portion.

11. The brake mechanism according to claim 10, wherein the movable portion is a rotary portion that is configured to rotate relative to the substrate.

12. The brake mechanism according to claim 1, wherein information representing the displacement is position error information derived from a signal acquired by reading the recorded information.

13. The brake mechanism according to claim 1, wherein there is a case where a vibration of the head is reduced by modifying the contact state.

14. The brake mechanism according to claim 1, wherein there is a case where a resonance frequency of the head is modified by modifying the contact state.

15. The brake mechanism according to claim 1, wherein there is a case where a wobbling of the head is reduced by modifying the contact state.

16. The brake mechanism according to claim 1, wherein the medium is a magnetic tape or an optical disc.

17. A head structure including:
the brake mechanism according to claim 1; and
the head.

18. A recording/reproduction device including:
the structure according to claim 17;
a processor that processes the read recorded information; and
a driver that moves the medium relative to the head.

19. A brake method including
modifying a contact state of a contact member that is configured to be brought into contact with a head with the head when information representing a displacement between a position read by the head in a medium read by the head that reads recorded information of a recorded information stream recorded on the medium that moves relatively, and a position of the recorded information stream exceeds a predetermined range.

20. A non-transitory computer readable medium recorded with a brake program that causes a computer to execute processing of modifying a contact state of a contact member that is configured to be brought into contact with a head with the head when information representing a displacement between a position read by the head in a medium read by the head that reads recorded information of a recorded information stream recorded on the medium that moves relatively, and a position of the recorded information stream exceeds a predetermined range.

* * * * *